(12) United States Patent
MacAvaney et al.

(10) Patent No.: US 11,630,952 B2
(45) Date of Patent: Apr. 18, 2023

(54) CLASSIFYING TERMS FROM SOURCE TEXTS USING IMPLICIT AND EXPLICIT CLASS-RECOGNITION-MACHINE-LEARNING MODELS

(71) Applicant: Adobe Inc., San Jose, CA (US)

(72) Inventors: Sean MacAvaney, Washington, DC (US); Franck Dernoncourt, Sunnyvale, CA (US); Walter Chang, San Jose, CA (US); Seokhwan Kim, San Jose, CA (US); Doo Soon Kim, San Jose, CA (US); Chen Fang, Hanover, NH (US)

(73) Assignee: Adobe Inc., San Jose, CA (US)

( * ) Notice: Subject to any disclaimer, the term of this patent is extended or adjusted under 35 U.S.C. 154(b) by 924 days.

(21) Appl. No.: 16/518,894

(22) Filed: Jul. 22, 2019

(65) Prior Publication Data

US 2021/0027141 A1    Jan. 28, 2021

(51) Int. Cl.
*G06F 17/15*    (2006.01)
*G06F 17/16*    (2006.01)
(Continued)

(52) U.S. Cl.
CPC ............ *G06F 40/279* (2020.01); *G06F 17/15* (2013.01); *G06F 17/16* (2013.01); *G06F 18/2431* (2023.01); *G06N 3/045* (2023.01); *G06V 10/764* (2022.01); *G06V 10/768* (2022.01); *G06V 10/809* (2022.01); *G06V 10/82* (2022.01)

(58) Field of Classification Search
CPC ........ G06F 17/15; G06F 17/16; G06F 40/279; G06K 9/628; G06K 9/6292; G06N 3/0445; G06N 3/0454; G06N 3/084; G06V 10/764; G06V 10/768; G06V 10/809; G06V 10/82
See application file for complete search history.

(56) References Cited

U.S. PATENT DOCUMENTS

2019/0080207 A1\* 3/2019 Chang .................... G06N 3/042
2019/0354583 A1\* 11/2019 Ralhan .................. G06F 40/151
(Continued)

OTHER PUBLICATIONS

Qi Liu,"A Study on Effects of Implicit and Explicit Language Model Information for DBLSTM-CTC Based Handwriting Recognition," Nov. 23, 2015,2015 13th International Conference on Document Analysis and Recognition (ICDAR), pp. 461-464.\*
Peng Zhou,"Text Classification Improved by Integrating Bidirectional LSTM with Two-dimensional Max Pooling," Nov. 21, 2016, Computation and Language, arXiv:1611.06639v1 [cs.CL] for this version),pp. 1-8.\*

(Continued)

*Primary Examiner* — Omar S Ismail

(74) *Attorney, Agent, or Firm* — Keller Preece PLLC

(57) ABSTRACT

This disclosure relates to methods, non-transitory computer readable media, and systems that can classify term sequences within a source text based on textual features analyzed by both an implicit-class-recognition model and an explicit-class-recognition model. For example, by applying machine-learning models for both implicit and explicit class recognition, the disclosed systems can determine a class corresponding to a particular term sequence within a source text and identify the particular term sequence reflecting the class. The dual-model architecture can equip the disclosed systems to apply (i) the implicit-class-recognition model to recognize implicit references to a class in source texts and (ii) the explicit-class-recognition model to recognize explicit references to the same class in source texts.

20 Claims, 16 Drawing Sheets

(51) Int. Cl.
*G06N 3/045* (2023.01)
*G06V 10/80* (2022.01)
*G06V 10/82* (2022.01)
*G06F 40/279* (2020.01)
*G06F 18/2431* (2023.01)
*G06V 10/764* (2022.01)
*G06V 10/70* (2022.01)

(56) References Cited

U.S. PATENT DOCUMENTS

| | | | | |
|---|---|---|---|---|
| 2020/0134449 A1* | 4/2020 | Perez | ............ | G06N 3/082 |
| 2020/0302029 A1* | 9/2020 | Holm | ............ | G06F 21/84 |
| 2020/0311198 A1* | 10/2020 | Poon | ............ | G06F 40/205 |
| 2020/0351228 A1* | 11/2020 | Dobrogost | ............ | G06T 17/00 |
| 2020/0356842 A1* | 11/2020 | Guo | ............ | G06F 17/15 |
| 2020/0367422 A1* | 11/2020 | Shniberg | ............ | A01C 1/00 |
| 2021/0004691 A1* | 1/2021 | Neumann | ............ | G16H 50/20 |

OTHER PUBLICATIONS

Imon Banerjee,"Comparative effectiveness of convolutional neural network (CNN) and recurrent neural network (RNN) architectures for radiology text report classification," Nov. 13, 2018,Artificial Intelligence In Medicine 97(2018), pp. 79-86.*

Yuansheng Hua,"Recurrently exploring class-wise attention in a hybrid convolutional and bidirectional LSTM network for multi-label aerial image classification," Jan. 18, 2019,ISPRS Journal of Photogrammetry and Remote Sensing 149(2019), pp. 188-197.*

Foteini Markatopoulou,"Implicit and Explicit Concept Relations in Deep Neural Networks for Multi-Label Video/Image Annotation," Jun. 18, 2018,IEEE Transactions on Circuits and Systems for Video Technology, vol. 29, No. 6, Jun. 2019, pp. 1631-1641.*

Joulin, A., Grave, E., Bojanowski, P. and Mikolov, T., 2016. Bag of tricks for efficient text classification. arXiv preprint arXiv:1607.01759.

Kim, Y., 2014. Convolutional neural networks for sentence classification. arXiv preprint arXiv:1408.5882.

* cited by examiner

CLASSIFYING TERMS FROM SOURCE TEXTS USING IMPLICIT AND EXPLICIT CLASS-RECOGNITION-MACHINE-LEARNING MODELS

BACKGROUND

Software developers and engineers have designed text classification systems to automatically classify sentences and other texts. Such conventional text classification systems can, for instance, identify nouns, verbs, or other parts of speech and (in some cases) the intent or meaning of a sentence using natural language processing. To generate conventional classifications, some text classification systems learn to identify parts of speech or identify meaning labels for texts using training samples of texts corresponding to ground-truth labels. Despite significant advances in text classification, however, existing text classification systems exhibit computing limitations that inhibit such systems from accurately identifying uncommon terms (i.e., long-tail classes with few training samples), rigidly restrict such systems to classifying sentences based on common training samples, and constrain such systems to imprecisely present classifications to users in unintuitive graphical user interfaces.

SUMMARY

This disclosure describes one or more embodiments of methods, non-transitory computer readable media, and systems that solve the foregoing problems in addition to providing other benefits. In particular, the disclosed systems can classify term sequences within a source text based on textual features analyzed by both an implicit-class-recognition model and an explicit-class-recognition model. By applying machine-learning models for both implicit and explicit class recognition, the disclosed systems can determine a class corresponding to a particular term sequence within a source text and identify the particular term sequence reflecting the class. The disclosed systems may determine, for instance, the particular term sequence corresponds to a named entity. To illustrate, the disclosed systems can analyze a source text, identify a software tool (out of a set of available software tools) implicitly or explicitly mentioned in the source text, and highlight the text sequence within the source text that references the software tool. As described below, the dual-model architecture equips the disclosed systems to apply the implicit-class-recognition model to recognize implicit references to a class in source texts and apply the explicit-class-recognition model to recognize explicit references to the same class in source texts.

BRIEF DESCRIPTION OF THE DRAWINGS

The detailed description refers to the drawings briefly described below.

DETAILED DESCRIPTION

Figure 1:
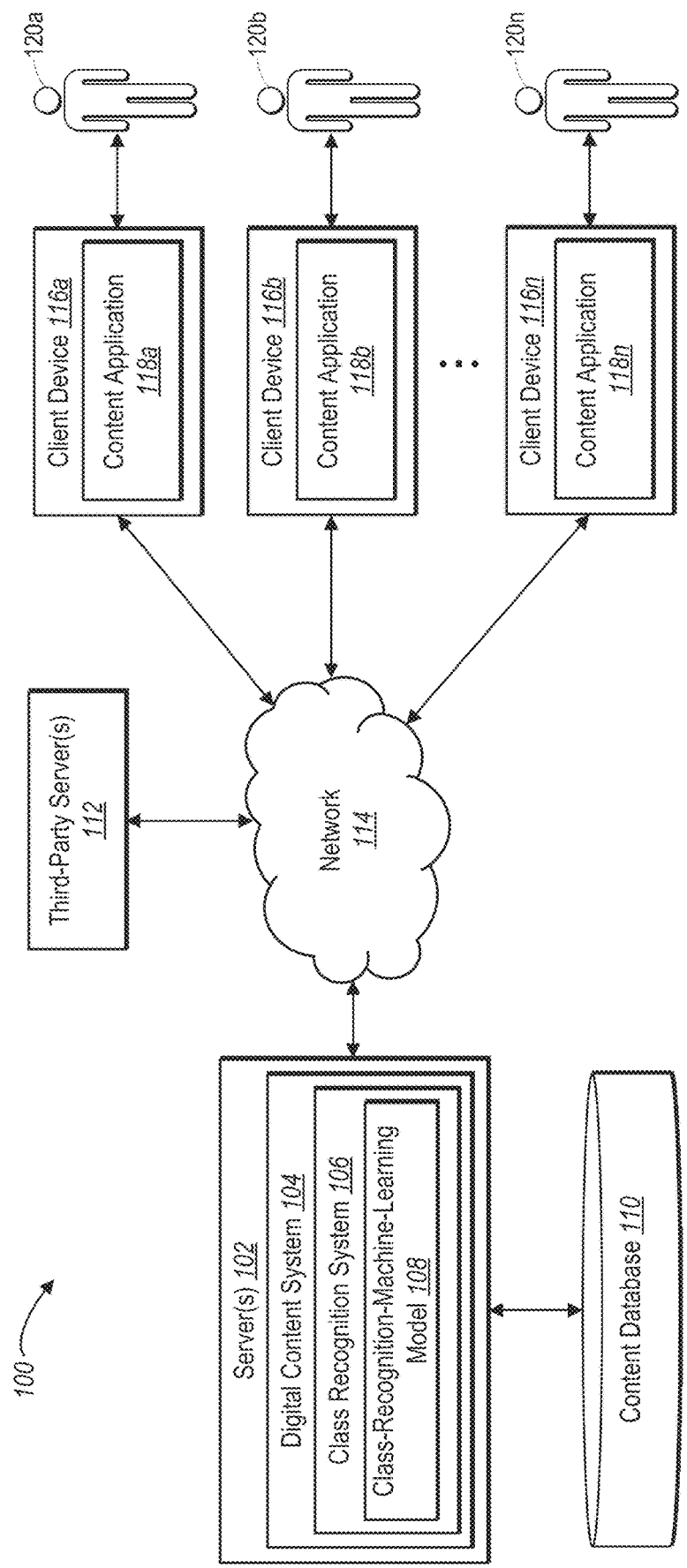
FIG. 1 illustrates a block diagram of an environment in which a digital content system and a class recognition system can operate in accordance with one or more embodiments.

This disclosure describes one or more embodiments of a class recognition system that classifies term sequences within a source text based on textual features analyzed by an implicit-class-recognition model and an explicit-class-recognition model. In one or more embodiments, the implicit-class-recognition model and the explicit-class-recognition model are part of a unified class-recognition-machine-learning model implemented by the class recognition system. By applying a dual-model architecture for class recognition, the class recognition system can determine a class referenced within a source text and identify the particular term sequence reflecting the class. Such a term sequence may be, for instance, a unigram, bigram, or trigram. To illustrate, the class recognition system can identify term sequences that reference particular software tools mentioned in a source text (allowing the class recognition system to provide selectable elements corresponding to the software tools). The dual-model architecture can accordingly equip the class recognition system to apply the implicit-class-recognition model to recognize different ways in which a class can be mentioned in source texts and apply the explicit-classrecognition model to recognize explicit class-text interaction patterns in source texts. Thus, the class recognition system can identify a class from source text, notwithstanding that the class corresponds to uncommon training samples.

In some embodiments, for instance, the class recognition system generates class scores corresponding to multiple classes for term sequences from a source text utilizing an implicit-class-recognition model. The class recognition system can further generate class scores corresponding to the multiple classes for the term sequences from the source text utilizing an explicit-class-recognition model. Both the class scores from the implicit-class-recognition model and the class scores from the explicit-class-recognition model can indicate a likelihood that the term sequences correspond to the multiple classes. In some embodiments, based on the class scores from the implicit-class-recognition model and the class scores from the explicit-class-recognition model, the class recognition system determines a class (from the multiple classes) corresponding to the source text and a term sequence from the source text reflecting the class.

As explained below, the implicit-class-recognition model can include long-short-term memory ("LSTM") layers and a convolutional neural network. To generate class scores, in some embodiments, the class recognition system uses the LSTM layers to generate feature vectors based on terms from the source text. Based on the feature vectors, the class recognition system can further use the convolutional neural network to generate the class scores for the term sequences. As suggested above, class scores from either the implicit-class-recognition model or the explicit-class-recognition model can include sets of unigram class scores, bigram class scores, and trigram class scores. In some embodiments, the class recognition system adjusts the class-recognition-machine-learning model to identify n-grams of various lengths (e.g., by applying a hyperparameter) and can accordingly generate class scores corresponding to various-length n-grams.

In addition to the architecture of the implicit-class-recognition model, in some embodiments, the explicit-class-recognition model includes a convolutional neural network for analyzing similarity matrices. For example, the class recognition system can generate similarity matrices based on terms from a source text and labels corresponding to different classes. In some cases, such a similarity matrix includes similarity scores between (i) features vectors for the terms of the source text and (ii) feature vectors for a label corresponding to a class (e.g., a named entity). Regardless of the matrix format, the class recognition system can analyze the similarity matrices using filters in the convolutional neural network to generate class scores for term sequences from the source text.

To identify a class and a corresponding term sequence from a source text, the class recognition system can consolidate class scores from both the implicit-class-recognition model and the explicit-class-recognition model. For instance, in some embodiments, the class recognition system applies a pooling layer (e.g., a max pooling layer) to class scores from the implicit-class-recognition model and class scores from the explicit-class-recognition model to generate a set of consolidated-class scores. The class recognition system can subsequently identify a term sequence and a corresponding class within the source text based on the set of consolidated-class scores.

Having identified a particular term sequence and a corresponding class, the class recognition system can provide a source text and an indication of the particular term sequence corresponding to a class for display. For instance, in certain cases, the class recognition system provides the source text and a visual indicator identifying the term sequence in the source text (as corresponding to the class) for display within a graphical user interface. The class recognition system can identify such term sequences and corresponding classes in response to requests to render a digital document, search digital documents, search audio transcriptions, or other requests.

As suggested above, the class recognition system can train an implicit-class-recognition model and an explicit-class-recognition model as part of a unified machine-learning model to classify term sequences from source texts. In some embodiments, for instance, the class recognition system generates training-class scores corresponding to multiple training classes for training-term sequences from a training-source text utilizing an implicit-class-recognition model. The class recognition system can further generate training-class scores corresponding to multiple training classes for training-term sequences from a training-source text utilizing an explicit-class-recognition model. In some embodiments, the class recognition system further applies (i) a first max pooling layer to consolidate the training-class scores for the training-term sequences and (ii) a second max pooling layer to the consolidated-training-class scores to determine or predict a training class corresponding to a training-term sequence from the training-source text.

Having predicted a training class corresponding to the training-term sequence, the class recognition system can compare the training class to a ground-truth class for the source text. In some cases, the class recognition system applies a loss function to determine a loss based on a comparison of the training class and the ground-truth class. Based on the determined loss, the class recognition system can modify internal parameters of the implicit-class-recognition model and the explicit-class-recognition model. By iteratively determining training classes corresponding to term sequences, comparing such training classes to ground-truth classes, and modifying internal parameters, the class recognition system can train the implicit-class-recognition model and the explicit-class-recognition model to classify term sequences from source texts.

As noted above, existing text classification systems demonstrate computing limitations that inhibit the accuracy, flexibility, and display of classifying sentences or other texts. For example, some existing text classification systems cannot classify uncommon sentences or texts corresponding to few (or no) training samples. As suggested above, such text classification systems sometimes learn meaning labels and document terms in supervised machine-learning models. Based on such training, existing text classification systems can compare learned labels to representations of terms in a new document to generate rankings for possible labels for the terms within a text. But such existing text classification systems frequently fail to rank uncommon labels based on insufficient training samples or insufficient variability in training samples. Such systems also cannot rank labels when training samples have no corresponding labels.

In addition to inaccurate classification, in some cases, conventional text classification systems rigidly identify texts matching training samples. By training to classify texts that only match training samples, conventional text classification systems often cannot classify variations or less-common synonyms for such texts. For instance, a conventional text classification system may correctly classify the term "New Jersey" as a state from the United States, but not correctly classify nicknames or other references to the same state, such as the "Garden State." Such text classification systems often fail to identify variations, nicknames, or other textual references corresponding to a label because the systems have been exclusively trained to identify identical references to texts or terms.

When a conventional text classification system correctly classifies a text, however, some such systems identify classes for a sentence within unintuitive graphical user interfaces. For example, conventional text classification systems commonly identify a classification for an entire sentence without any humanly interpretable output for the classification. Such conventional user interfaces with unexplained classifications can confuse viewers and limit the utility of a text classification system.

The class recognition system can overcome these and other technical deficiencies hindering conventional text classification systems. For instance, the class recognition system can more accurately detect and classify terms corresponding to classes of less common (or unavailable) training samples. By applying machine-learning models for both implicit and explicit class recognition, the class recognition system can not only recognize explicit references to a class within a source text but also variations and other expressions from implicit textual references to the same class. Because of its dual-model architecture, the class recognition system can train or apply a unified class-recognition-machine-learning model to identify a class seldom (or not) found in training samples. As demonstrated below, in some embodiments, the class recognition system can accurately classify terms sequences corresponding to new classes or new references to classes not found within training samples upon which the system was trained.

In addition to improving classification accuracy, in certain implementations, the class recognition system identifies a term sequence from a source text reflecting a class with more flexibility than existing text classification systems. Rather than exclusively or rigidly identifying term sequences corresponding to a class precisely matching labels from training samples, the class recognition system can train or apply a class-recognition-machine-learning model that identifies a class expressed in various different terms or term sequences that existing text classification systems currently fail to recognize. In some embodiments, for instance, the class recognition system can apply or train such a machine-learning model to recognize various labels for a class to correctly identify different expressions referring to the class throughout source texts.

Beyond improving the flexibility of classification, in certain cases, the class recognition system improves the precision and intuitiveness of classifying term sequences in the context of a source text. Rather than indicating an entire sentence corresponds to a class, the class recognition system applies a unified class-recognition-machine-learning model to identify specific term sequences that reflect a class and distinguishes such specific term sequences (from surrounding terms) in the source text. In short, the class recognition system can identify precise terms corresponding to a class rather than an entire sentence. Based on such precise recognition, the class recognition system can further generate more informative and user-friendly graphical user interfaces presenting classifications—by providing the source text and a visual indicator identifying the term sequence in the source text (as corresponding to the class) in a graphical user interface.

As indicated by the foregoing description, this disclosure uses a variety of terms to describe features and advantages of the class recognition system. As used in this disclosure, the word "term sequence" refers to one or more words that individually or collectively correspond to a particular meaning. In some cases, a term sequence refers to an n-gram or contiguous sequence of n items from a given sample of text or speech. Accordingly, a term sequence may include a unigram, a bigram, a trigram, or other n-gram.

Further, the term "class" refers to a particular category or classification. In particular, a class can include a category of words displaying a common property or common meaning. For example, the class recognition system can utilize classes corresponding to different comments (e.g., offensive, low quality, helpful) or classes corresponding to software tools (e.g., paint tool or fill tool within a digital image editing application). Thus, in certain applications, the term class refers specifically to a named entity. Such a named entity includes items or objects corresponding to persons, locations, organizations, products, software tools, or other such objects.

Relatedly, the term "class score" refers to a score indicating a measure of likelihood that a term sequence corresponds to a class. In some embodiments, for example, a class score refers to a probability that a term sequence from a source text refers to a class. As suggested above, a class score may be particular to an n-gram, such as a unigram class score, a bigram class score, or a trigram class score.

As suggested above, a class may correspond to one or more labels. The term "label" refers to a semantic reference to (or a name for) a class. Because a class may be expressed or described in various words, a single class may correspond to multiple labels. For instance, a named entity of "Dr. Seuss" may include both the labels "Theodore Seuss Geisel" and "Dr. Seuss." To differentiate between a term from a source text and a term from a label, this disclosure frequently refers to a term from a source text as a "source term" and a term from a class label as a "label term."

As further suggested above, the term "implicit-class-recognition model" refers to a machine learning model, such as an artificial neural network, trained to generate class scores based on mentions or references to a class (e.g., non-class-label references) within source texts. Thus, an implicit-class-recognition model can generate class scores for term sequences indicating an implicit reference to a class in a source text. Accordingly, an implicit-class-recognition model can learn to match class labels with different implicit references in source texts (e.g., references in source texts that differ from the class labels). As suggested above, in some embodiments, the implicit-class-recognition model includes a combination of LSTM layers, a convolutional neural network, and at least one a pooling layer.

The term "explicit-class-recognition model" refers to a machine learning model, such as an artificial neural network, trained to generate class scores based on explicit use of class labels within source texts. Thus, an explicit-class-recognition model can generate class scores for term sequences indicating an explicit reference to a class in a source text. In particular, an explicit-class-recognition model can learn class-text interaction patterns within different source texts and generate class scores based on these interaction patterns. As suggested above, in some embodiments, the explicit-class-recognition model includes a combination of a convolutional neural network and pooling layers.

Turning now to FIG. 1, this figure depicts a block diagram illustrating an exemplary system environment ("environment") 100 in which a class recognition system 106 can operate in accordance with one or more embodiments. Specifically, FIG. 1 illustrates the environment 100 comprising server(s) 102, third-party server(s) 112, a network 114, and client devices 116a-116n. The client devices 116a-

116n are, respectively, associated with users 120a-120n. Although FIG. 1 illustrates a particular number of client devices and users, the environment 100 can alternatively include any number of client devices and associated users. Similarly, although FIG. 1 illustrates a particular arrangement of the server(s) 102, the third-party server(s) 112, the network 114, and the client devices 116a-116n, various additional arrangements are possible.

As shown in FIG. 1, the server(s) 102, the third-party server(s) 112, the network 114, and the client devices 116a-116n may be communicatively coupled with each other either directly or indirectly, such as coupling through the network 114, which is described further below in relation to FIG. 12. The server(s) 102 and the client devices 116a-116n may include a variety of different computing devices, including one or more computing devices, as discussed further below in relation to FIG. 12.

As depicted in FIG. 1, the server(s) 102 can generate, store, receive, and/or transmit any type of data, including requests to render digital documents, search audio transcriptions or other digital content, or perform operations on digital documents, video, or other digital content. For example, the server(s) 102 can receive a request to render a digital document comprising a source text from the client device 116a. The server(s) 102 can further transmit data packets that, upon receipt, cause the client device 116a to present the source text and an indication of a term sequence corresponding to a class within a graphical user interface. In some embodiments, the server(s) 102 comprise a data server, a communication server, or a web-hosting server.

As further shown in FIG. 1, the server(s) 102 can include a digital content system 104. The digital content system 104 can perform various rendering, searching, modification, or other functions with regard to a digital document, video, or other digital content. For example, in some embodiments, the digital content system 104 uses the server(s) 102 to annotate, display, convert, digitally sign, generate, edit, encrypt, modify, and render digital documents based on requests from the client devices 116a-116n. The digital content system 104 may render such documents with visual indicators identifying term sequences in source texts and corresponding classes for such term sequences. Relatedly, in some cases, the digital content system 104 accesses, converts, requests, modifies, or performs other such functions for digital documents, videos, transcriptions, or other digital content stored on the third-party server(s) 112.

In addition to the digital content system 104, the server(s) 102 includes the class recognition system 106. The class recognition system 106 (or the digital content system 104) can use the server(s) 102 to request from the third-party server(s) 112 (or retrieve from a content database 110) digital audio, video, images, documents, or other digital content requested by the client devices 116a-116n, such as source texts within such digital content. In response to a request from the client device 116a to render or search for a source text, for example, the digital content system 104 in conjunction with the class recognition system 106 provides the source text and a visual indicator identifying the term sequence in the source text (as corresponding to the class) for display within a graphical user interface.

As further indicated by FIG. 1, to identify a term sequence and corresponding class, the class recognition system 106 uses a class-recognition-machine-learning model 108. The class recognition system 106 can use the server(s) 102 to generate class scores corresponding to multiple classes for term sequences from a source text utilizing an implicit-class-recognition model. The class recognition system 106 can further use the server(s) 102 to generate class scores corresponding to the multiple classes for the term sequences from the source text utilizing an explicit-class-recognition model. Both the implicit-class-recognition model and the explicit-class-recognition model are part of the class-recognition-machine-learning model 108. Based on the class scores from both the implicit and explicit class-recognition models, the class recognition system 106 uses the server(s) 102 to determine a class (from the multiple classes) corresponding to the source text and a term sequence from the source text reflecting the class.

As illustrated by previous embodiments, the class recognition system 106 can be implemented in whole or in part by the individual elements of the environment 100. Although FIG. 1 illustrates the class recognition system 106 implemented within the server(s) 102, components of the class recognition system 106 can be implemented in any of the components of the environment 100. For instance, in some embodiments, the client device 116a comprises the class recognition system 106 and performs all (or part) of the functions, methods, and processes of the class recognition system 106 described above and below. This disclosure describes the components of the class recognition system 106 further below with regard to FIG. 10.

As further shown in FIG. 1, in some embodiments, the client devices 116a-116n enable the users 120a-120n to, respectively, send and receive digital communications. In certain implementations, the client devices 116a-116n include one or more software applications that enable the users 120a-120n to generate, edit, render, request, search, or otherwise use digital documents or other digital content. For example, the client devices 116a-116n respectively include content applications 118a-118n. The content applications 118a-118n can each be a software application installed on the client devices 116a-116n or a software application hosted on the server(s) 102. When hosted on the server(s) 102, the content application 118a may be accessed by the client device 116a, for instance, through another application, such as a web browser.

In some implementations, the content applications 118a-118n each include instructions that, when executed by a processor, cause the client devices 116a-116n to, respectively, present one or more graphical user interfaces, such as a graphical user interface comprising a source text and a visual indicator identifying the term sequence in the source text as corresponding to a class. Further, in certain embodiments, the content application 118a includes instructions that, when executed by a processor, cause the client device 116a to present a graphical user interface comprising options, fields, or other input variations for the user 120a to generate, edit, render, request, search, or otherwise use a digital document or other digital content.

As further illustrated in FIG. 1, the digital content system 104 is communicatively coupled to the content database 110. Among other things, the content database 110 can include audio files, images, documents, videos, or other digital content corresponding to individual users. In one or more embodiments, the digital content system 104 accesses and queries data from the content database 110 associated with requests from the class recognition system 106. For instance, the digital content system 104 may access digital documents, images, or videos corresponding to users for the class recognition system 106. As shown in FIG. 1, the content database 110 is separately maintained from the server(s) 102. Alternatively, in one or more embodiments, the digital content system 104 and the content database 110 comprise a single combined system or subsystem within the server(s) 102.

Figure 2:
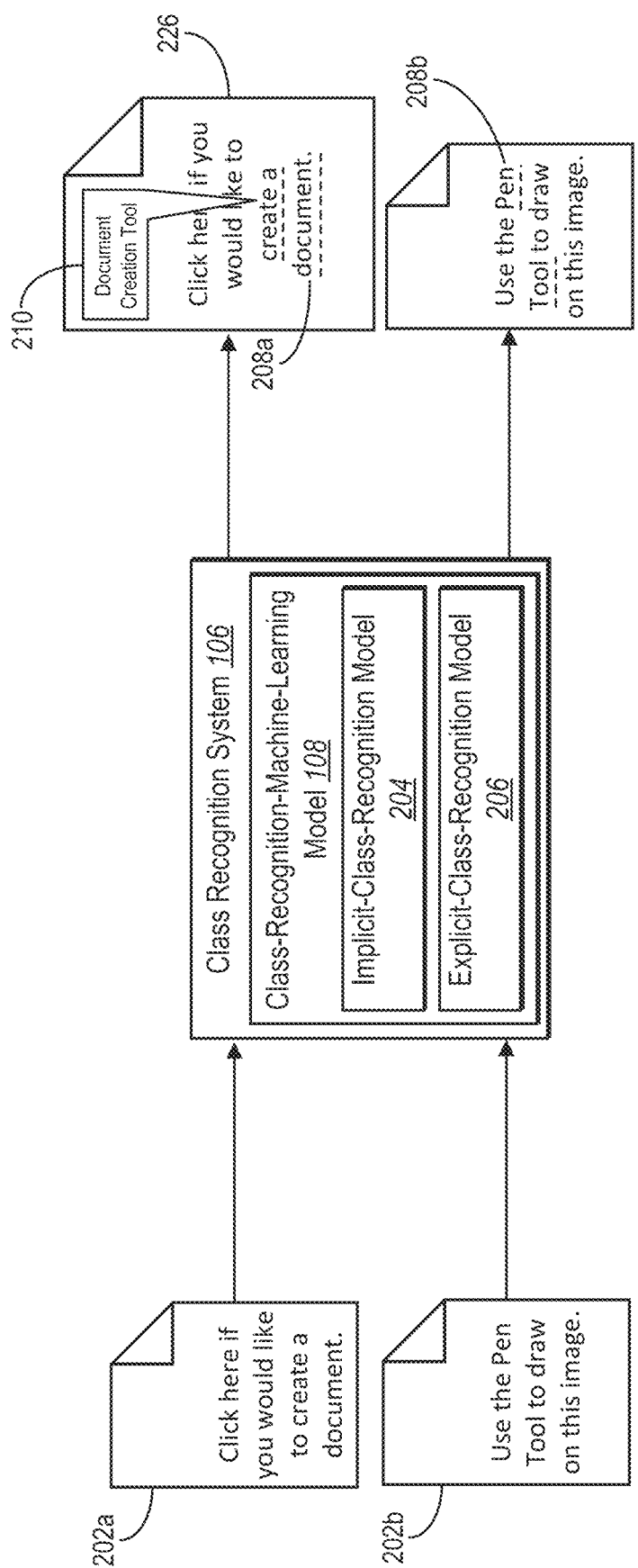
FIG. 2 illustrates the class recognition system determining classes corresponding to term sequences from source texts using a class-recognition-machine-learning model in accordance with one or more embodiments.

FIG. 2 illustrates an overview of the class recognition system 106 classifying term sequences within different source texts based on textual features analyzed by the class-recognition-machine-learning model 108 in accordance with one or more embodiments. As shown in FIG. 2, both an implicit-class-recognition model 204 and an explicit-class-recognition model 206 are part of the class-recognition-machine-learning model 108. By applying the dual-model architecture of the class-recognition-machine-learning model 108, the class recognition system 106 can apply the implicit-class-recognition model 204 and the explicit-class-recognition model 206 to recognize implicit and explicit references to classes in a source text 202a and a source text 202b. Accordingly, the class recognition system 106 can use class scores from both the implicit-class-recognition model 204 and the explicit-class-recognition model 206 to identify implicit and explicit references to a class.

As depicted by FIG. 2, the class recognition system 106 identifies the source text 202a from within a digital document. The source text 202a includes various term sequences, including unigrams and bigrams (e.g., a unigram of "if" and a bigram of "click here"). In this particular embodiment, the source text 202a includes a term sequence that implicitly references a named entity (e.g., the phrase "create a document" referring to a software tool). The class recognition system 106 generates and uses class scores from both the implicit-class-recognition model 204 and the explicit-class-recognition model 206 to identify the term sequence as corresponding to the class.

By using the implicit-class-recognition model 204, the class recognition system 106 generates a first plurality of class scores corresponding to a plurality of classes for term sequences from the source text 202a. For example, the class recognition system 106 uses LSTM layers from the implicit-class-recognition model 204 to generate feature vectors based on terms from the source text 202a. Based on the feature vectors, the class recognition system 106 further uses a convolutional neural network from the implicit-class-recognition model 204 to generate the first plurality of class scores for the term sequences in the source text 202a.

In addition to generating the first plurality of class scores, the class recognition system 106 applies the explicit-class-recognition model 206 to generate a second plurality of class scores corresponding to the plurality of classes for term sequences from the source text 202a. For example, the class recognition system 106 generates similarity matrices based on (i) terms from the source text 202a and (ii) labels corresponding to the plurality of classes. The class recognition system 106 subsequently analyzes the similarity matrices using a convolutional neural network from the explicit-class-recognition model 206. Based on the convolutional neural network's analysis of similarity matrices, the class recognition system 106 generates the second plurality of class scores for the term sequences from the source text 202a.

To identify the class and the corresponding term sequence from the source text 202a, the class recognition system 106 applies a pooling layer to the first plurality of class scores and the second plurality of class scores to generate consolidated-class scores. Based on the consolidated-class scores, the class recognition system 106 subsequently identifies a term sequence 208a from the source text 202a and a corresponding class within the source text 202a. For instance, the class recognition system 106 can identify a class score from among the consolidated-class scores for the term sequence 208a that both satisfies a threshold class score and corresponds to a particular class (e.g., a named entity).

As further indicated by FIG. 2, the class recognition system 106 provides the source text 202a and a visual indicator identifying the term sequence 208a in the source text 202a (as corresponding to the class) for display within a graphical user interface. In some cases, the class recognition system 106 optionally provides a class identifier 210 for display within a graphical user interface based on a user interaction with the term sequence 208a. As described below, the class identifier 210 may expressly identify the class and further refer or link to selectable options corresponding to the class (e.g., by linking to menu options for a software tool). Here in FIG. 2, the class identifier 210 expressly identifies a named entity (e.g., "Document Creation Tool").

Similar to its analysis of the source text 202a, the class recognition system 106 identifies the source text 202b from a digital document. Among various unigrams and bigrams, the source text 202b includes a term sequence that explicitly references a named entity (e.g., "Pen Tool" as a software tool). Consistent with the disclosure above, the class recognition system 106 applies (i) the implicit-class-recognition model 204 to generate a first plurality of class scores corresponding to a plurality of classes for term sequences from the source text 202b and (ii) the explicit-class-recognition model 206 to generate a second plurality of class scores corresponding to the plurality of classes for term sequences from the source text 202b. Based on consolidated-class scores from both implicit and explicit models, the class recognition system 106 identifies a term sequence 208b from the source text 202b and a corresponding class within the source text 202b.

As indicated by FIG. 2, the class recognition system 106 likewise provides the source text 202b and a visual indicator identifying the term sequence 208b in the source text (as corresponding to the class) for display within a graphical user interface. In this embodiment, the term sequence 208b expressly identifies the class. In some cases, the class recognition system 106 further links the term sequence 208b to options related to the class, such as by linking the term sequence 208b to menu options for a software tool available within a content application.

Figure 3:
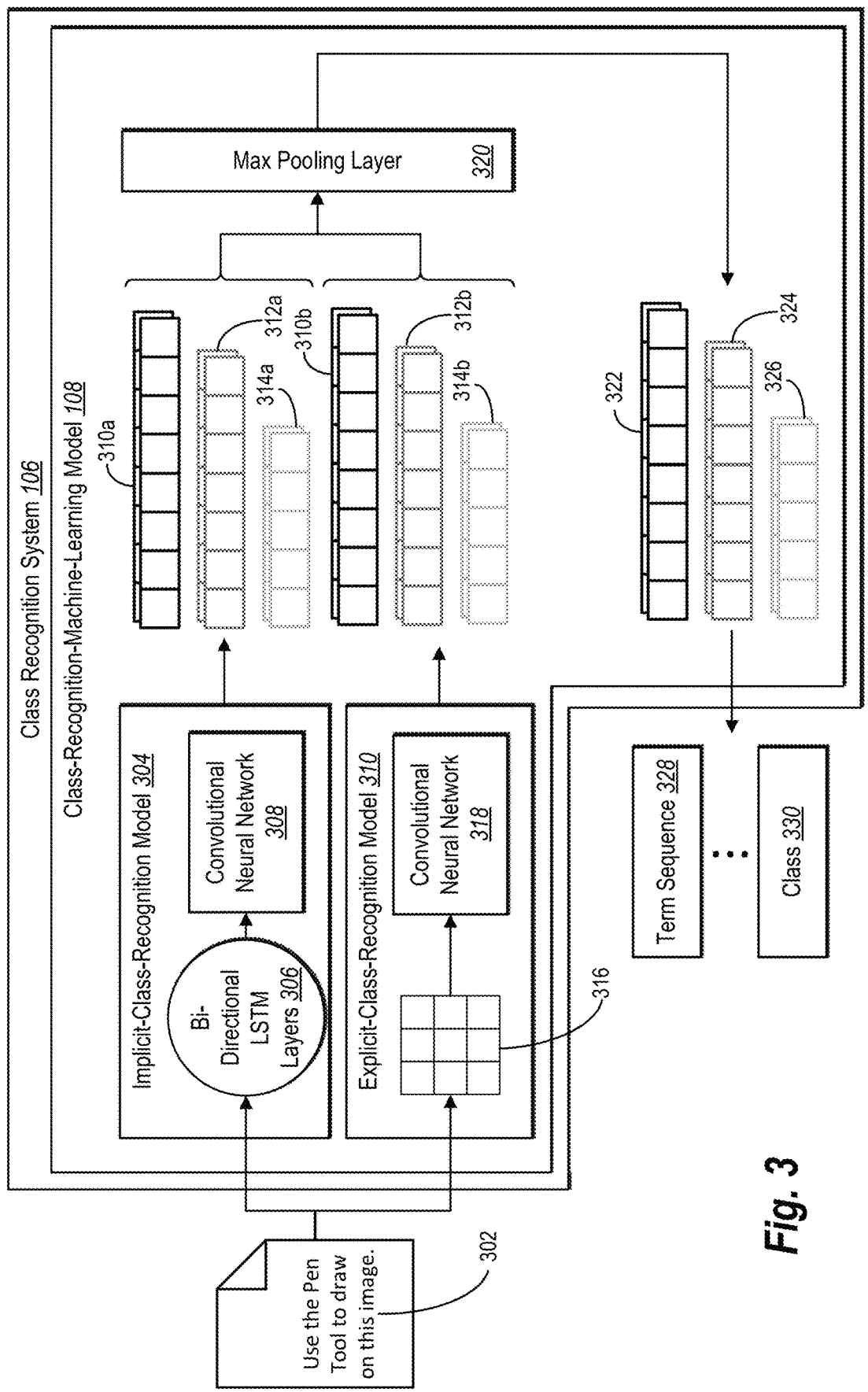
FIG. 3 illustrates the class recognition system determining a class corresponding to a term sequence from source texts using class scores from implicit and explicit class-recognition models in accordance with one or more embodiments.

FIG. 3 illustrates one or more embodiments of the class recognition system 106 classifying a term sequence within a source text based on textual features analyzed by models within the class-recognition-machine-learning model 108—an implicit-class-recognition model 304 and an explicit-class-recognition model 310. In particular, FIG. 3 depicts some architectural components of both the implicit-class-recognition model 304 and the explicit-class-recognition model 310 and examples of class scores generated by both models. Based on consolidated-class scores from both implicit and explicit models, the class recognition system 106 identifies a term sequence 328 from a source text 302 and a class 330 corresponding to the term sequence 328.

As shown in FIG. 3, the class recognition system 106 identifies the source text 302 from a digital document. Additionally, or alternatively, in some embodiments, the class recognition system 106 identifies the source text 302 within a digital document based on a search query from the client device 116a, a request to render the digital document from the client device 116a, or a rendering of a video corresponding to an audio transcription on the client device 116a. Regardless of the trigger for identifying the source text 302, the class recognition system 106 analyzes features of the source text 302 using components from both the implicit-class-recognition model 304 and the explicit-class-recognition model 310.

In addition to identifying and analyzing unigrams, bigrams, and trigrams within the source text 302, in some embodiments, the class recognition system 106 adjusts the class-recognition-machine-learning model 108 to identify n-grams of various length. For example, the class recognition system 106 can apply a hyperparameter within (or as part of) the class-recognition-machine-learning model 108 to identify quadrigrams, pentagrams, or n-grams of various length. The class recognition system 106 can accordingly adjust the hyperparameter to identify n-grams of any selected length.

As depicted in FIG. 3, the implicit-class-recognition model 304 includes bi-directional LSTM layers 306 and a convolutional neural network 308. In some embodiments, for example, the class recognition system 106 applies the bi-directional LSTM layers 306 to term embeddings corresponding to terms from the source text 302. Based on the term embeddings, the bi-directional LSTM layers 306 generate feature vectors for the terms. In some cases, each feature vector corresponding to each term includes concatenated feature vectors from both forward LSTM layers and backwards LSTM layers.

After generating the feature vectors for individual terms within the source text 302, the class recognition system 106 uses the convolutional neural network 308 to generate class scores 310a, 312a, and 314a. For example, in some cases, the class recognition system 106 applies a convolutional filter to each feature vector for each term from the source text 302. For each class from multiple classes, the class recognition system 106 can apply a one-dimensional convolutional filter to each feature vector. Based on applying such a class-specific-convolutional filter to each feature vector, in some embodiments, the implicit-class-recognition model 304 outputs class scores corresponding to multiple classes for term sequences within the source text 302. For simplicity, FIG. 3 depicts the class scores 310a, 312a, and 314a after a layer of consolidation explained further below.

As further shown in FIG. 3, in some embodiments, the class scores 310a, 312a, and 314a respectively correspond to unigram class scores, bigram class scores, and trigram class scores. In particular, the class scores 310a indicate a likelihood that individual unigrams from the source text 302 correspond to a particular class. Accordingly, each box shown in the class scores 310a correspond to a class score and a unigram. To account for multiple classes, the class scores 310a include different class scores for individual unigrams corresponding to different classes. Similarly, the class scores 312a and 314a respectively indicate a likelihood that individual bigrams and trigrams from the source text 302 correspond to a particular class. Accordingly, each box in the class scores 312a and 314a correspond to a class score and, respectively, a bigram and a trigram. In some embodiments, the class recognition system 106 generates class scores for other n-grams, such as quadrigram class scores and pentagram class scores.

In addition to applying the implicit-class-recognition model 304, the class recognition system 106 further uses the explicit-class-recognition model 310 to analyze the source text 302. As indicated by FIG. 3, in some embodiments, the explicit-class-recognition model 310 includes a similarity matrix generator 316 and a convolutional neural network 318. In certain implementations, the class recognition system 106 uses the similarity matrix generator 316 to generate similarity matrices based on (i) terms from the source text 302 and (ii) labels corresponding to multiple classes. For each label for a class, for example, the class recognition system 106 can generate a similarity matrix comprising similarity scores (e.g., cosine similarity) between source-term-feature vectors for the terms from the source text 302 and label-feature vectors for a label corresponding to a class.

As further indicated by FIG. 3, the class recognition system 106 uses the convolutional neural network 318 to analyze the similarity matrices generated by the similarity matrix generator 316. For example, in some embodiments, the class recognition system 106 applies convolutional filters to similarity scores from the similarity matrices. By using the convolutional neural network 318, the class recognition system 106 can apply convolutional filters to similarity scores corresponding to unigrams, bigrams, or trigrams from the source text 302.

Based on the similarity matrices as inputs, the convolutional neural network 318 outputs class scores 310b, 312b, and 314b. Similar to their counterparts from the implicit-class-recognition model 304, in some embodiments, the class scores 310b, 312b, and 314b respectively correspond to unigram class scores, bigram class scores, and trigram class scores. Again for simplicity, FIG. 3 depicts the class scores 310b, 312b, and 314b after a layer of consolidation explained further below.

To identify a class and a corresponding term sequence from the source text 302, the class recognition system 106 further applies a max pooling layer 320 to consolidate (i) the class scores 310a and 310b, (ii) the class scores 312a and 312b, and (iii) the class scores 314a and 314b. By applying the max pooling layer 320, for instance, the class recognition system 106 selects a highest class score for each term sequence corresponding to a class to generate consolidated-class scores 322, 324, and 326. Accordingly, in some cases, the consolidated-class scores 322, for example, represent the highest class scores both per term sequence (e.g., per unigram) and per class from among the class scores 310a and 310b. Consistent with the disclosure above, in some embodiments, the consolidated-class scores 322, 324, and 326 respectively correspond to consolidated unigram class scores, consolidated bigram class scores, and consolidated trigram class scores.

Based on the consolidated-class scores 322, 324, and 326, the class recognition system 106 determines that the class 330 (from among multiple protentional classes) corresponds to the source text 302 and determines that the term sequence 328 from the source text 302 reflects the class 330. For example, in some embodiments, the class recognition system 106 identifies a consolidated-class score from among the consolidated-class scores 322, 324, and 326 satisfying a threshold class score. Based on determining that the class score satisfies such a threshold, the class recognition system 106 identifies the term sequence 328 corresponding to the class score as reflecting the class 330.

While FIG. 3 depicts the class recognition system 106 identifying a single term sequence from a source text corresponding to a class, in some embodiments, the class recognition system 106 identifies multiple term sequences in a source text corresponding to different classes. For instance, in some cases, the class recognition system 106 identifies a first consolidated-class score for a first term sequence and a second consolidated-class score for a second term sequence from among the consolidated-class scores 322, 324, and 326 as satisfying the threshold class score. The class recognition system 106 accordingly identifies the first term sequence as reflecting a first class and the second term sequence as reflecting a second class.

Figure 4:
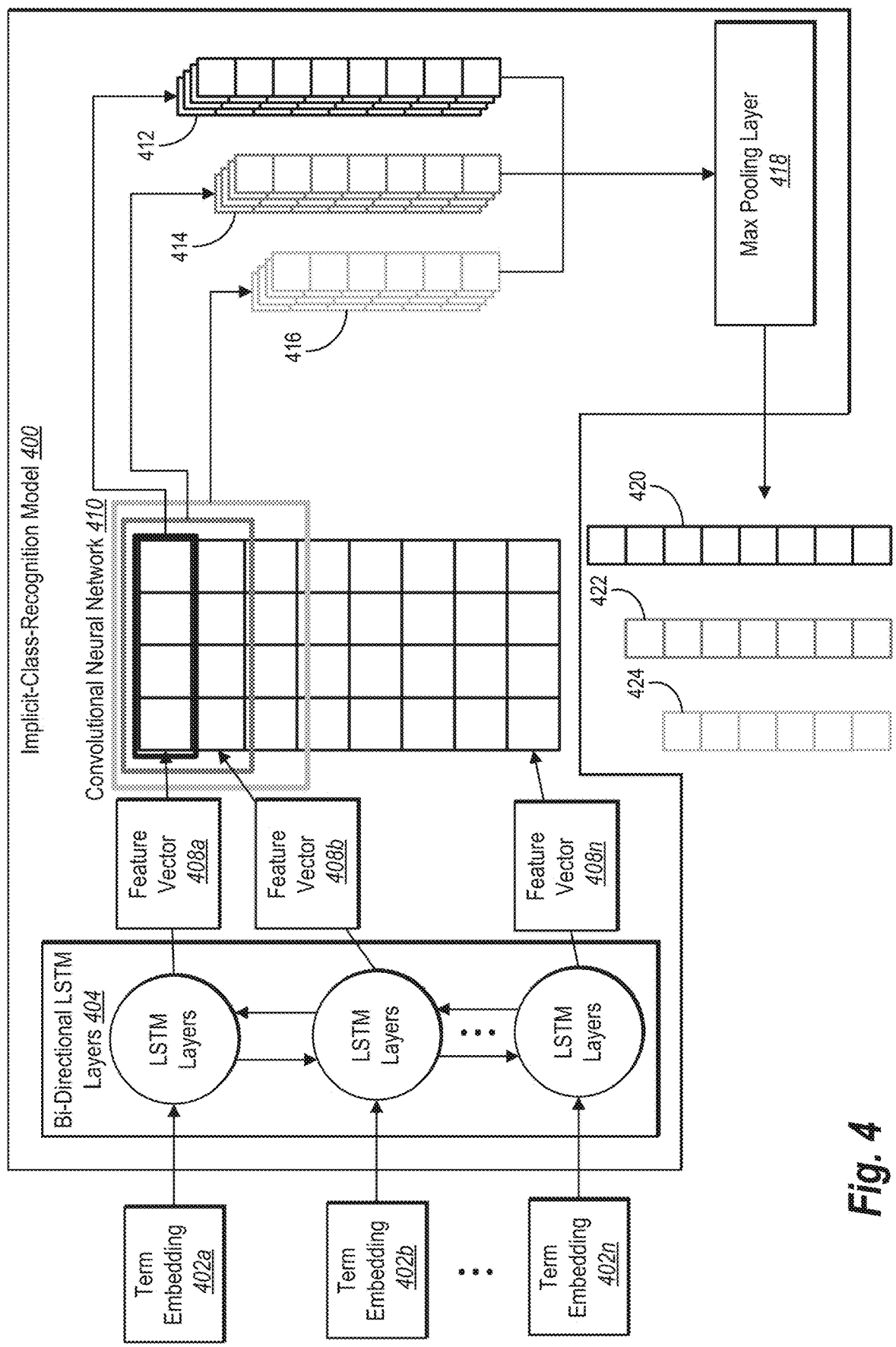
FIG. 4 illustrates the class recognition system generating class scores for term sequences using an implicit-class-recognition model in accordance with one or more embodiments.

FIG. 4 illustrates an implicit-class-recognition model 400 generating class scores for term sequences from a source text according to one or more embodiments. As shown in FIG. 4, the class recognition system 106 applies bi-directional LSTM layers 404 from the implicit-class-recognition model 400 to term embeddings 402a-402n from terms of a source text to generate feature vectors 408a-408n. The class recognition system 106 further applies a convolutional neural network 410 to the feature vectors 408a-408n to generate preliminary class scores 412, 414, and 416 corresponding to a class for term sequences. By applying a max pooling layer 418, the class recognition system 106 generates preliminary consolidated-class scores 420, 422, and 424 corresponding to the class for the term sequences. By generating a set of preliminary consolidated-class scores for each class and each term sequence, the class recognition system 106 accordingly generates a plurality of class scores corresponding to a plurality of classes for term sequences using the implicit-class-recognition model 400.

As indicated by FIG. 4, in some embodiments, the class recognition system 106 generates a term embedding for each term from a source text. The term embeddings 402a-402n accordingly include a term embedding for each term in a source text. In certain implementations, for example, the class recognition system 106 maps a term from a source text to a vector by converting a high-dimensional representation of the term to a lower-dimensional representation of the term. In some such embodiments, the class recognition system 106 applies one-hot-vector encoding or a Word2Vec model to the terms to generate the term embeddings 402a-402n. Alternatively, the class recognition system 106 can apply a Global Vectors ("GloVe") model or another semantic-word-vector model to generate the term embeddings 402a-402n.

As further shown in FIG. 4, the class recognition system 106 applies the bi-directional LSTM layers 404 to the term embeddings 402a-402n to generate the feature vectors 408a-408n. For instance, in some embodiments, the class recognition system 106 applies forward LSTM layers and backwards LSTM layers from the bi-directional LSTM layers 404 to generate both forward-feature vectors and backward-feature vectors for the term embedding 402a. The class recognition system 106 subsequently concatenates the forward-feature vectors and the backward-feature vectors to generate the feature vector 408a for the term embedding 402a. By similarly applying the forward LSTM layers and backwards LSTM layers from the bi-directional LSTM layers 404, the class recognition system 106 generates and concatenates forward-feature vectors and backward-feature vectors for the term embeddings 402b and 402n to generate the feature vectors 408b and 408n, respectively.

After generating the feature vectors 408a-408n, the class recognition system 106 further applies the convolutional neural network 410 to the feature vectors 408a-408n to generate the preliminary class scores 412, 414, and 416 corresponding to a class. The preliminary class scores 412, 414, and 416 accordingly indicate a likelihood that an individual term sequence corresponds to the class. When applying the convolutional neural network 410, in some cases, the class recognition system 106 applies a class-specific-convolutional filter to each of the feature vectors 408a-408n to generate the preliminary class scores 412, 414, and 416. Such a class-specific-convolutional filter can be one dimensional and correspond to variations of convolutional filters for a specific class.

As indicated by FIG. 4, in some embodiments, the class recognition system 106 applies the convolutional neural network 410 to capture various combinations of terms from the source text and to generate a preliminary class score for each term sequence in the source text. For example, in certain implementations, the class recognition system 106 applies (i) a class-specific-convolutional filter to the feature vector 408a to generate a first preliminary unigram class score, (ii) a class-specific-convolutional filter to the feature vector 408b to generate a second preliminary unigram class score, and (iii) a class-specific-convolutional filters to the feature vectors 408a and 408b to generate a preliminary bigram class score. In some cases, the convolutional neural network 410 comprises class-specific-convolutional filters for unigrams, bigrams, and trigrams that the class recognition system 106 respectively applies to feature vectors corresponding to each unigram, bigram, and trigram from a source text. By systematically applying class-specific-convolutional filters from the convolutional neural network 410 to each feature vector and each combination of contiguous feature vectors, the convolutional neural network 410 outputs the preliminary class scores 412, 414, and 416.

Consistent with the disclosure above, in some embodiments, the convolutional neural network 410 outputs the preliminary class scores 412, 414, and 416 respectively corresponding to preliminary unigram class scores, preliminary bigram class scores, and preliminary trigram class scores. As further indicated above, each of the preliminary class scores 412, 414, and 416 include multiple sets of preliminary class scores corresponding to different convolutional filters for a class. In some such embodiments, the different convolutional filters correspond to (and each sets of preliminary class scores include scores for) different labels for a class.

As further suggested by FIG. 4, the convolutional neural network 410 includes multiple class-specific-convolutional filters for a class. In the convolutional neural network 410, for example, the top row of boxes includes different class-specific-convolutional filters for a class (e.g., four variant convolutional filters corresponding to the class). By applying the different class-specific-convolutional filters to feature vectors representing unigrams, for example, the convolutional neural network 410 outputs the preliminary class scores 412. By further applying a combination of different class-specific-convolutional filters to feature vectors collectively representing bigrams and trigrams, the convolutional neural network 410 outputs the preliminary class scores 414 and 416, respectively. By applying multiple class-specific-convolutional filters, the class recognition system 106 can identify various different references to corresponding classes (e.g., various implicit ways to mention a class label).

For illustrative purposes, FIG. 4 identifies initial filter groupings for the convolutional neural network 410 to apply to corresponding unigrams, bigrams, and trigrams. The top row of the convolutional neural network 410, for example, represents an initial filter grouping for unigram-feature vectors (designated by a first shaded box) to which the convolutional neural network 410 applies convolutional filters. The top two rows of the convolutional neural network 410 represent an initial filter grouping for bigram-feature vectors (designated by a second shaded box) to which the convolutional neural network 410 applies convolutional filters. Finally, the top three rows of the convolutional neural network 410 represent an initial filter grouping for trigram-feature vectors (designated by a third shaded box) to which the convolutional neural network 410 applies convolutional filters. While FIG. 4 depicts initial filter groupings for feature vectors analyzed by the convolutional neural network 410, the class recognition system 106 uses filter groupings from different cells of the convolutional neural network 410 when analyzing subsequent feature vectors representing further unigrams, bigrams, and trigrams.

After generating the preliminary class scores 412, 414, and 416, the class recognition system 106 applies a max pooling layer 418 to consolidate such scores. By applying the max pooling layer 418 to the preliminary class scores 412, for instance, the class recognition system 106 selects a highest class score for each term sequence corresponding to a class to generate preliminary consolidated-class scores 420. The max pooling layer 418 similarly selects a highest class score from the preliminary class scores 414 (and the preliminary class scores 416) for each term sequence corresponding to the class to generate preliminary consolidated-class scores 422 (and preliminary consolidated-class scores 424). Accordingly, in some cases, the preliminary consolidated-class scores 420, 422, and 424 represent the highest class scores per term sequence for a class from among the preliminary class scores 412, 414, and 416, respectively. Consistent with the disclosure above, in some embodiments, the preliminary consolidated-class scores 420, 422, and 424 respectively correspond to consolidated unigram class scores, consolidated bigram class scores, and consolidated trigram class scores.

As noted above, FIG. 4 illustrates the class recognition system 106 applying the implicit-class-recognition model 400 to generate the preliminary consolidated-class scores 420, 422, and 424 corresponding to a single class for term sequences from a source text. Although not shown in FIG. 4, in some embodiments, the convolutional neural network 410 includes different class-specific-convolution filters for each class. By applying the different class-specific-convolutional filters, the class recognition system 106 likewise generates preliminary consolidated-class scores corresponding to a plurality of classes for term sequences from the source text. Such preliminary consolidated-class scores are an example of the class scores 310a, 312a, and 314a depicted in FIG. 3 from the implicit-class-recognition model 304.

Figure 5A:
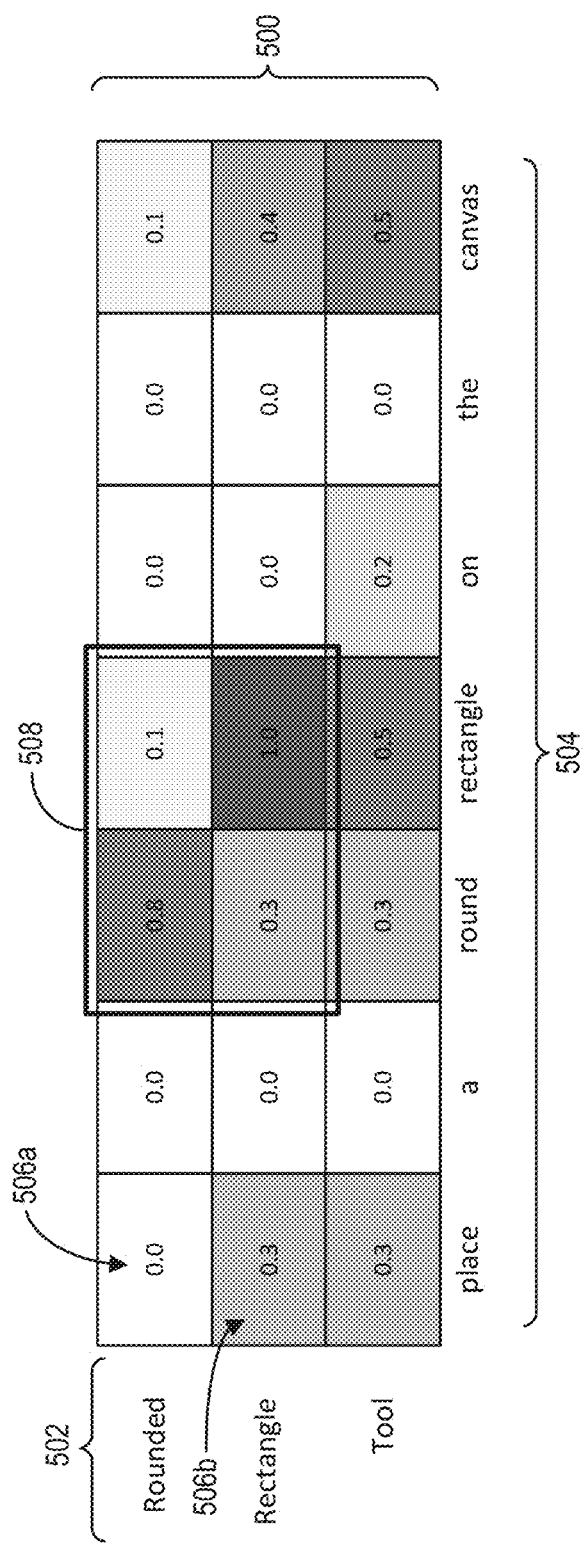
FIG. 5A illustrates the class recognition system generating a similarity matrix in accordance with one or more embodiments.
Figure 5B:
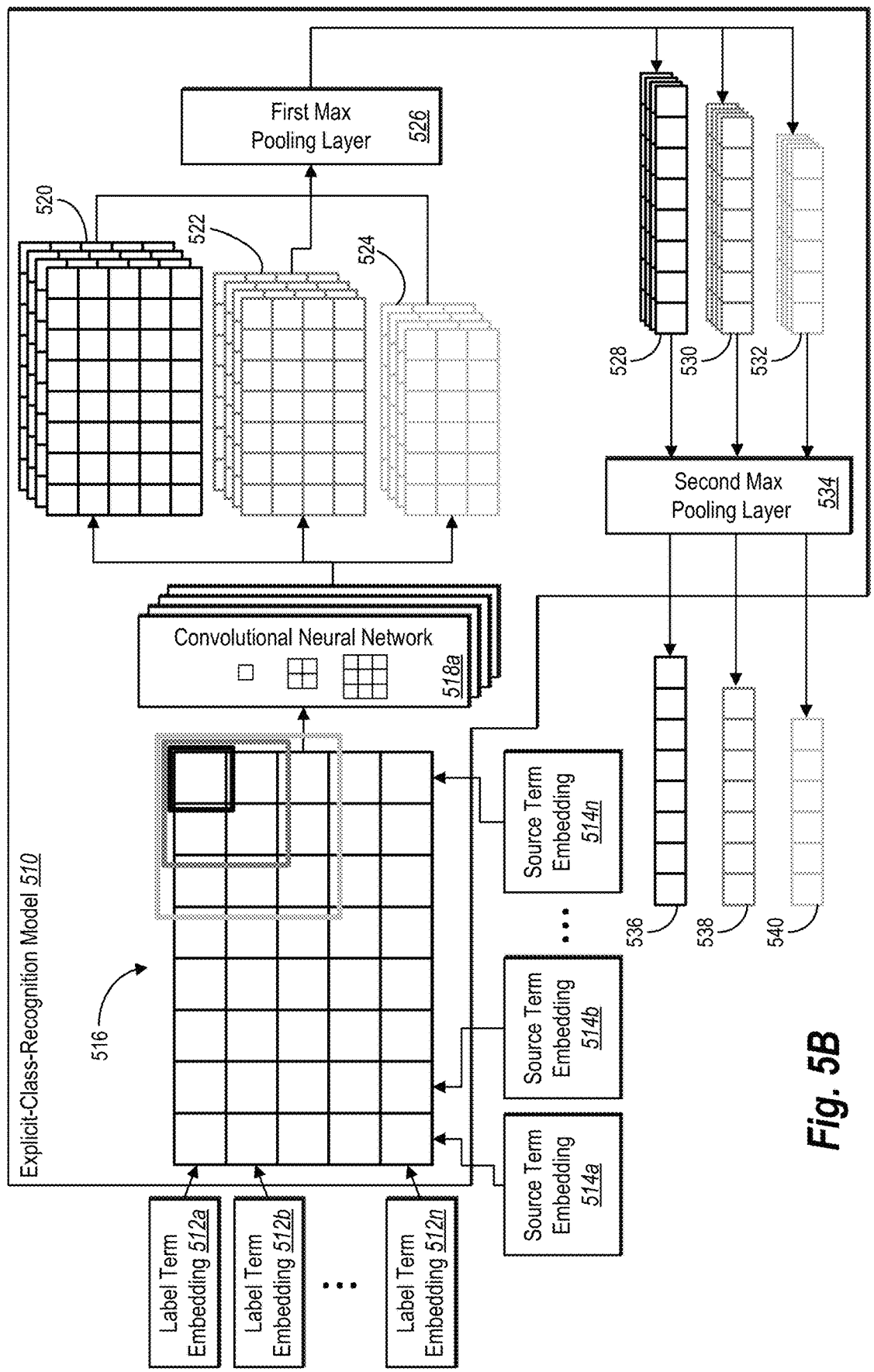
FIGS. 5B and 5C illustrate the class recognition system generating class scores for term sequences using an explicit-class-recognition model in accordance with one or more embodiments.
Figure 5C:
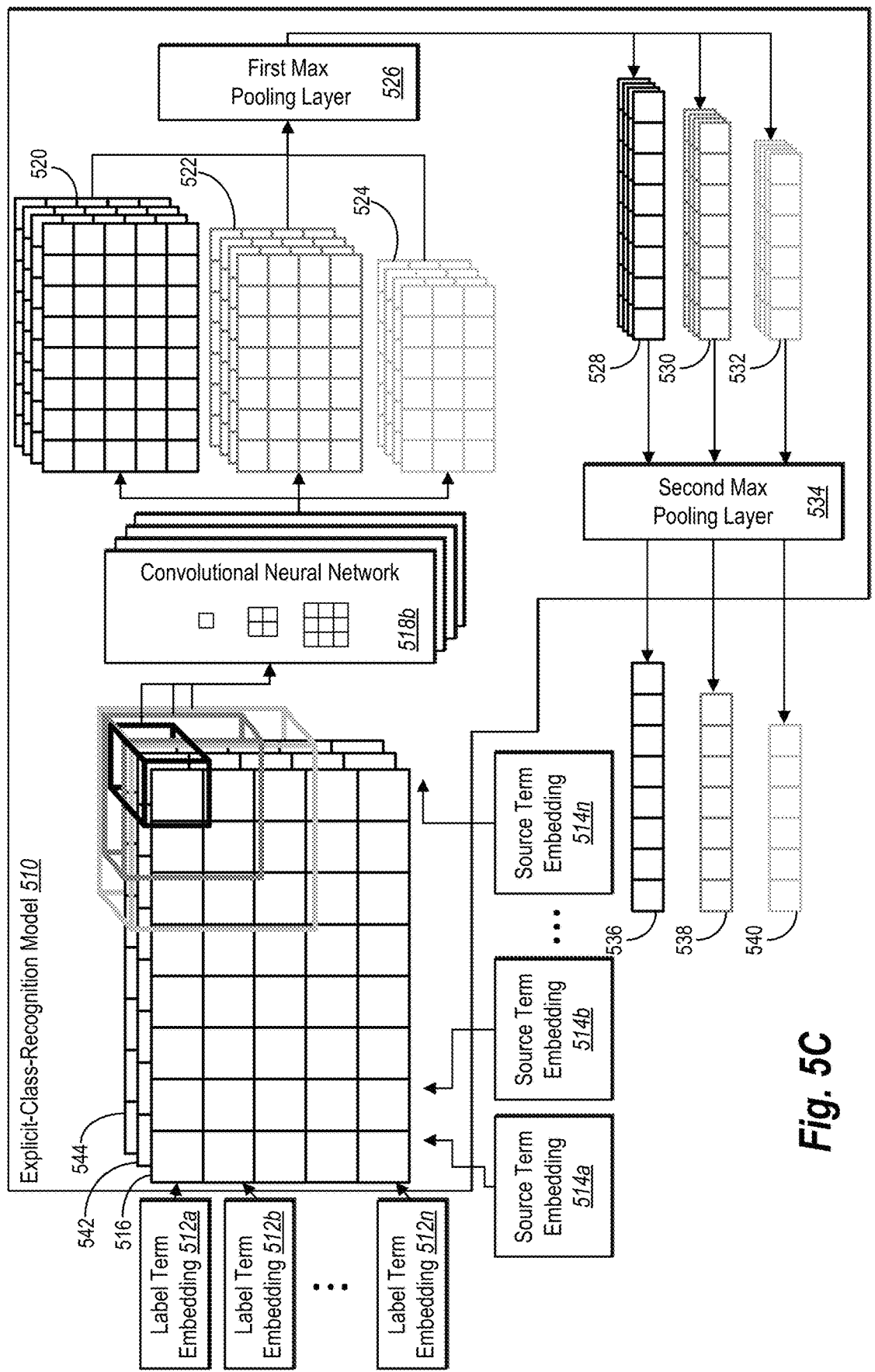

Turning now to FIGS. 5A-5C, these figures illustrate one or more embodiments of an explicit-class-recognition model and its corresponding architecture and functions. As indicated above and depicted in FIGS. 5A-5C, the class recognition system 106 uses an explicit-class-recognition model to generate class scores corresponding to multiple classes for term sequences from a source text based on similarity matrices. The class recognition system 106 generates and subsequently analyzes similarity scores (e.g., cosine similarity) in such similarity matrices using a convolutional neural network to output class scores. FIG. 5A, for instance, illustrates the class recognition system 106 generating a similarity matrix 500 comprising similarity scores between (i) feature vectors for terms of a source text and (ii) feature vectors for a label corresponding to a class.

As shown in FIG. 5A, the class recognition system 106 receives inputs corresponding to two-dimensional convolutions to generate the similarity matrix 500. As a first dimension, the class recognition system 106 converts label terms 502 from a label for a class into feature vectors. As a second dimension, the class recognition system 106 converts source terms 504 from a source text into feature vectors. For example, the class recognition system 106 can apply a Word2Vec model, a GloVe model, or another semantic-word-vector model to each term from the label terms 502 and the source terms 504 to generate a term embedding corresponding to each term from the label terms 502 and the source terms 504.

Based on label-feature vectors for the label terms 502 and source-term-feature vectors for the source terms 504, the class recognition system 106 generates similarity scores in the similarity matrix 500. As shown in cell 506a of the similarity matrix 500, for example, the class recognition system 106 generates a first similarity score indicating a distance or similarity (e.g., cosine similarity) between a first label-feature vector for a first label term and a first source-term-feature vector for a first source term. As shown in cell 506b of the similarity matrix 500, the class recognition system 106 similarly generates a second similarity score indicating a distance or similarity between a second label-feature vector for a second label term and the first source-term-feature vector for the first source term. In some embodiments, each similarity score represents a cosine similarity between a label-feature vector and a source-term-feature vector.

By determining a similarity score from a comparison of each label-feature vector and each source-term-feature vector, the class recognition system 106 generates the similarity scores in the similarity matrix 500. As illustrated here, FIG. 5A indicates higher similarity scores for a pair of a label-feature vector and a source-term-feature vector in the similarity matrix 500 with darker shading and lower similarity scores for a pair of a label-feature vector and a source-term-feature vector in the similarity matrix 500 with lighter (or no) shading. For instance, the shading for the similarity score in the cell 506b is darker (and indicates a higher similarity score than) the non-existent shading for the similarity score in the cell 506a.

By repeatedly generating similarity matrices during training, in certain implementations, the class recognition system 106 can learn associations between terms based on similarity scores. For example, the class recognition system 106 may learn that a term sequence frequently occurs in both source texts and class labels, such as bigrams and trigrams frequently occurring in both source texts and class labels. As shown in FIG. 5A, for example, the class recognition system 106 identifies a soft-bigram interaction 508 indicating an inexact match between a bigram in the label terms 502 (e.g., "Rounded Rectangle") and a bigram in the source terms 504 (e.g., "round rectangle"). As indicated by the similarity scores corresponding to the soft-bigram interaction 508, the class recognition system 106 determines a relatively high degree of similarity between terms of the two respective bigrams.

As further shown in FIG. 5A, the soft-bigram interaction 508 corresponds to a convolutional kernel of cells within which a diagonal series of similarity scores (from top left to bottom right) indicates the high degree of similarity between the respective bigrams. The soft-bigram interaction 508 in FIG. 5A is merely an example. By repeatedly generating similarity matrices during training, the class recognition system 106 can likewise learn other types of associations between label terms and source terms for bigrams, trigrams, or other n-grams based on similarity scores.

In some cases, the learned associations are inexact, such as the soft-bigram interaction 508 in which terms from the respective bigrams are not an exact match (e.g., "Rounded" and "Round"). By contrast, in some cases, the learned associations are exact, such as a perfect-bigram interaction (or a perfect-trigram interaction) in which both terms in the respective bigrams (or all three terms in the respective trigrams) are an exact match (e.g., "Rounded Rectangle" and "Rounded Rectangle"). The class recognition system 106 can further learn associations ordered in reverse from source text to a label, or vice versa, such as a reverse-bigram interaction (e.g., "Pen Tool" and "Tool Pen"). Alternatively, the class recognition system 106 can further learn associations between source texts and labels that skip or omit terms (e.g., "Create Document" and "Create a Document").

As indicated above, the class recognition system 106 can generate and subsequently analyze similarity scores from such similarity matrices using a convolutional neural network to output class scores. FIG. 5B illustrates the class recognition system 106 using such a similarity matrix in an explicit-class-recognition model 510 according to one or more embodiments. As shown in FIG. 5B, the class recognition system 106 generates a similarity matrix 516 based on terms from the source text and a label corresponding to a class. The class recognition system 106 further applies a convolutional neural network 518*a* to similarity scores from the similarity matrix 516 to generate preliminary class scores corresponding to a class for term sequences from the source text. The class recognition system 106 subsequently applies a first max pooling layer 526 and a second max pooling layer 534 to consolidate the preliminary class scores. By generating multiple similarity matrices and applying the convolutional neural network 518*a* to the similarity matrices, the class recognition system 106 generates and consolidates a plurality of class scores corresponding to a plurality of classes for term sequences from the source text.

As indicated by FIG. 5B, the class recognition system 106 converts label terms from a class label into label term embeddings 512*a*-512*n*. The class recognition system 106 similarly converts source terms from a source text into source term embeddings 514*a*-514*n*. Consistent with the disclosure above, the label term embeddings 512*a*-512*n* and the source term embeddings 514*a*-514 represent examples of label-feature vectors and source-term-feature vectors, respectively. The class recognition system 106 subsequently generates a similarity score from a comparison of (i) each label term embedding from the label term embeddings 512*a*-512*n* and (ii) each source term embedding from the source term embeddings 514*a*-514*n*. The similarity matrix 516 accordingly represents a collection of such similarity scores, where each cell corresponds to a different similarity score.

After generating the similarity scores for the similarity matrix 516, the class recognition system 106 applies the convolutional neural network 518*a* to the similarity scores to generate preliminary class scores 520, 522, 524 corresponding to different term sequences. In some embodiments, for example, the class recognition system 106 inputs similarity scores from the similarity matrix 516 as convolutional kernels into the convolutional neural network 518*a*. According to certain implementations, each different-sized convolutional kernel corresponds to a unigram, bigram, or a trigram from the source text.

As shown in the similarity matrix 516, for example, the top-right cell represents an initial convolutional kernel for a similarity score for a unigram (designated by a first shaded box) to which convolutional filters apply. The top-right four cells of the similarity matrix 516 represent an initial convolutional kernel for similarity scores for bigrams (designated by a second shaded box) to which convolutional filters apply. Finally, the top-right nine cells of the similarity matrix 516 represent an initial convolutional kernel for similarity scores for trigrams (designated by a third shaded box) to which convolutional filters apply. While FIG. 5B depicts initial convolutional kernels of similarity scores for the convolutional neural network 518*a*, the class recognition system 106 uses convolutional kernels from different cells of the similarity matrix 516 when analyzing subsequent similarity scores representing further unigrams, bigrams, and trigrams.

Upon identifying similarity scores from the similarity matrix 516, the convolutional neural network 518*a* applies variant convolutional layers to each convolutional kernel of similarity scores. As indicated by FIG. 5B, the convolutional neural network 518*a* includes multiple variant convolutional layers comprising different convolutional filters for a class. In some cases, each variant convolutional layer corresponds to a label for a class. For purposes of simplicity, FIG. 5B depicts variant convolutional layers corresponding to a single class. In some implementations, however, the convolutional neural network 518*a* includes variant convolutional layers corresponding to different classes.

As further indicated by FIG. 5B, the convolutional neural network 518*a* applies the variant convolutional layers to the similarity scores from the similarity matrix 518 as represented within each convolutional kernel. As the convolutional neural network 518*a* analyzes each similarity score for a convolutional kernel corresponding to a unigram, the convolutional neural network 518*a* outputs a preliminary class score corresponding to the unigram shown among the preliminary class scores 520. As the convolutional neural network 518*a* analyzes each set of similarity scores for a convolutional kernel corresponding to a bigram, the convolutional neural network 518*a* outputs a preliminary class score corresponding to the bigram shown among the preliminary class scores 522. As the convolutional neural network 518*a* analyzes each set of similarity scores for a convolutional kernel corresponding to a trigram, the convolutional neural network 518*a* outputs a preliminary class score corresponding to the trigram shown among the preliminary class scores 524.

After generating the preliminary class scores 520, 522, and 524, the class recognition system 106 applies the first max pooling layer 526 to consolidate such scores. By applying the first max pooling layer 526 to the preliminary class scores 520, for instance, the class recognition system 106 selects a highest class score for each term sequence output by each variant convolutional layer corresponding to a class to generate preliminary consolidated-class scores 528. The first max pooling layer 526 similarly selects a highest class score from the preliminary class scores 522 (and the preliminary class scores 524) for each term sequence output by each variant convolutional layer corresponding to the class to generate preliminary consolidated-class scores 530 (and preliminary consolidated-class scores 532). Accordingly, in some cases, the preliminary consolidated-class scores 528, 530, and 532 represent the highest preliminary class scores per term sequence for a class output by a convolutional variant layer from among the preliminary class scores 520, 522, and 524, respectively.

As further depicted by FIG. 5B, the class recognition system 106 applies the second max pooling layer 534 to further consolidate the preliminary consolidated-class scores 528, 530, and 532. By applying the second max pooling layer 534 to the preliminary consolidated-class scores 528, 530, and 532, the class recognition system 106 selects a highest class score for each term sequence corresponding to a class to generate refined-consolidated-class scores 536, 538, and 540, respectively. Accordingly, in some cases, the refined-consolidated-class scores 536, 538, and 540 represent the highest preliminary consolidated-class scores per term sequence for the class from among the preliminary consolidated-class scores 528, 530, and 532, respectively.

As noted above, FIG. 5B illustrates the class recognition system 106 applying the explicit-class-recognition model 510 to generate the refined-consolidated-class scores 536, 538, and 540 corresponding to a single class for term sequences from a source text. Although not shown in FIG. 5A, in some embodiments, the convolutional neural network 518a includes different class-specific-convolution layers for each class. By applying the different class-specific-convolution layers, the class recognition system 106 likewise generates refined-consolidated-class scores corresponding to a plurality of classes for term sequences from the source text. Such refined-consolidated-class scores are an example of the class scores 310b, 312b, and 314b depicted in FIG. 3 from the explicit-class-recognition model 310.

In addition to similarity scores, in some embodiments, the class recognition system 106 also generates term frequency measures for terms within a source text as further inputs for a convolutional neural network in an explicit-class-recognition model. FIG. 5C illustrates an example of the class recognition system 106 generating term frequency measures for source terms within a source text and within class labels. The class recognition system 106 analyzes or inputs such term frequency measures in cells of inverse-document-frequency channels 542 and cells of inverse-intersecting-frequency channels 544. The class recognition system 106 further applies a convolutional neural network 518b to the term frequency measures and similarity scores from a similarity matrix to generate preliminary class scores.

As indicated by FIG. 5C, in certain implementations, the class recognition system 106 generates inverse document frequencies for source terms appearing within a collection of labels for the inverse-document-frequency channels 542. Such a collection of labels may be for a particular class or for any class. For example, the class recognition system 106 may determine a frequency of a source term within a collection of labels and divide a total number of labels by the frequency of the source term. By dividing the total number of labels by the frequency of the source term within the collection of labels, the class recognition system 106 generates an inverse document frequency for the source term.

In certain implementations, each cell of the inverse-document-frequency channels 542 corresponds to a cell of the similarity matrix 516. To associate an inverse document frequency for a source term with various similarity scores for the source term, the class recognition system 106 can accordingly input the inverse document frequency for the source term in cells for a column of the inverse-document-frequency channels 542 corresponding to cells in the similarity matrix 516 for a column of a source term embedding for the source term.

As further indicated by FIG. 5C, in certain implementations, the class recognition system 106 generates inverse intersecting frequencies for source terms within the source text for the inverse-intersecting-frequency channels 544. For example, the class recognition system 106 may determine a frequency of a source term within a source text and divide a total number of terms in the source text by the frequency of the source term. By dividing the total number of terms in the source text by the frequency of the source term within the source text, the class recognition system 106 generates an inverse intersecting frequency for the source term.

In certain implementations, each cell of the inverse-intersecting-frequency channels 544 corresponds to a cell of the similarity matrix 516. To associate an inverse intersecting frequency for a source term with various similarity scores for the source term, the class recognition system 106 can accordingly input the inverse intersecting frequency for the source term in cells for a column of the inverse-intersecting-frequency channels 544 corresponding to cells in the similarity matrix 516 for a column of a source term embedding for the source term.

As further indicated by FIG. 5C, the class recognition system 106 may include such inverse document frequencies and inverse intersecting frequencies in convolutional kernels. As shown in FIG. 5C, for example, the top-right cell for each of the similarity matrix 516, the inverse-document-frequency channels 542, and the inverse-intersecting-frequency channels 544 represent an initial convolutional kernel for a unigram (designated by a first shaded box) to which the convolutional neural network 518b applies convolutional filters. The top-right four cells for each of the similarity matrix 516, the inverse-document-frequency channels 542, and the inverse-intersecting-frequency channels 544 represent an initial convolutional kernel for bigrams (designated by a second shaded box) to which the convolutional neural network 518b applies convolutional filters. Finally, the top-right nine cells for each of the similarity matrix 516, the inverse-document-frequency channels 542, and the inverse-intersecting-frequency channels 544 represent an initial convolutional kernel for trigrams (designated by a third shaded box) to which the convolutional neural network 518b applies convolutional filters.

As further indicated by FIG. 5C, the convolutional neural network 518b applies the variant convolutional layers to the similarity scores, inverse document frequencies, and inverse intersecting frequencies corresponding to each convolutional kernel. As the convolutional neural network 518b analyzes each similarity score, inverse document frequency, and inverse intersecting frequency for a convolutional kernel corresponding to a unigram, the convolutional neural network 518b outputs a preliminary class score corresponding to the unigram shown among the preliminary class scores 520. As the convolutional neural network 518b analyzes each set of similarity scores, inverse document frequencies, and inverse intersecting frequencies for a convolutional kernel corresponding to a bigram, the convolutional neural network 518b outputs a preliminary class score corresponding to the bigram shown among the preliminary class scores 522. As the convolutional neural network 518b analyzes each set of similarity scores, inverse document frequencies, and inverse intersecting frequencies for a kernel corresponding to a trigram, the convolutional neural network 518b outputs a preliminary class score corresponding to the trigram shown among the preliminary class scores 524.

As further shown in FIG. 5C, the class recognition system 106 subsequently applies the first max pooling layer 526 and the second max pooling layer 534 to consolidate the preliminary class scores 520, 522, and 524. Accordingly, in some embodiments, the refined-consolidated-class scores 536, 538, and 540 from the explicit-class-recognition model 510 account for similarity scores, inverse document frequencies, and inverse intersecting frequencies.

Figure 6:
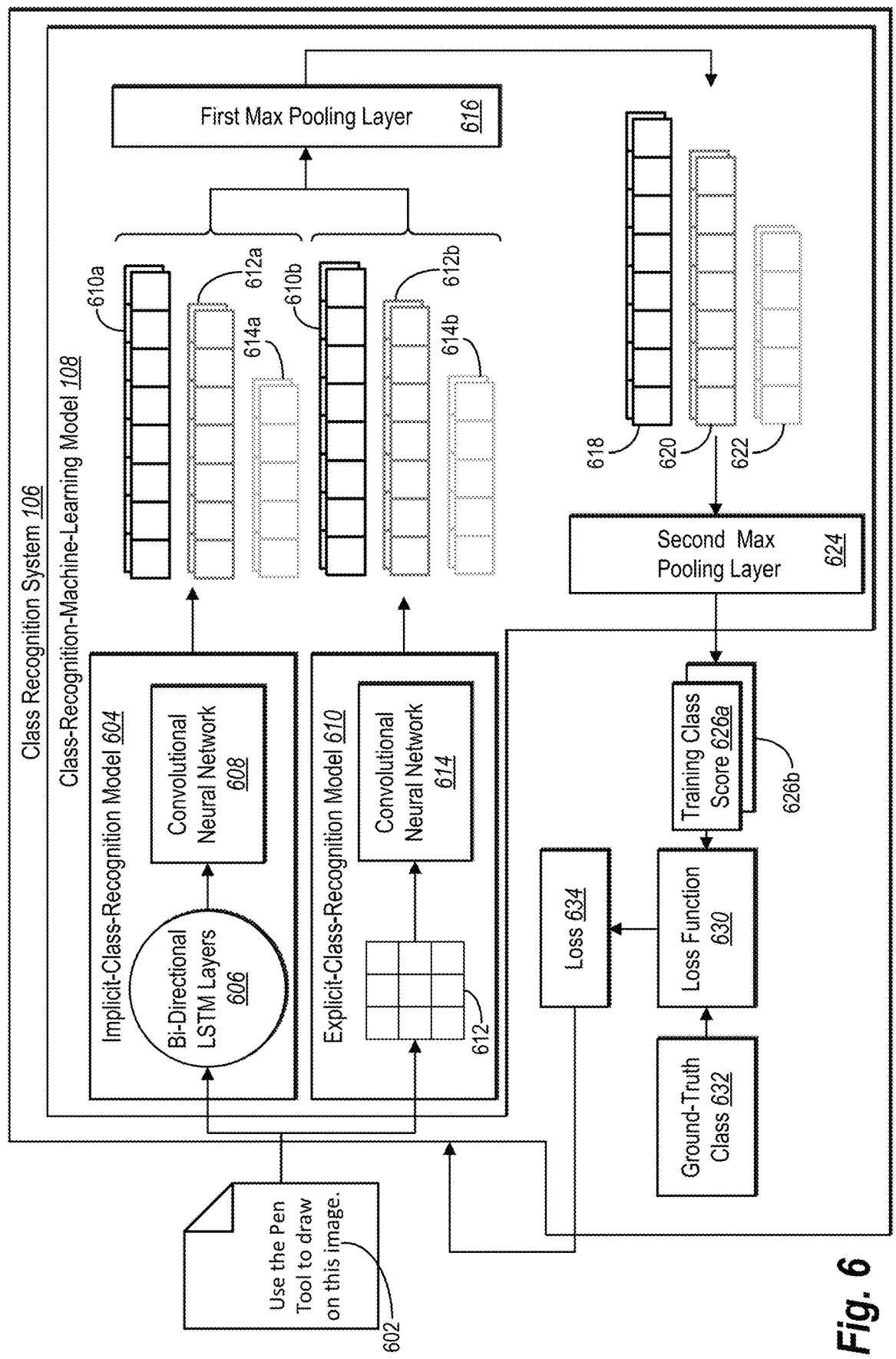
FIG. 6 illustrates the class recognition system training a class-recognition-machine-learning model to classify term sequences from source texts in accordance with one or more embodiments.

As noted above, in certain implementations, the class recognition system 106 trains an implicit-class-recognition model and an explicit-class-recognition model as part of a unified machine-learning model to classify term sequences from source texts. FIG. 6 illustrates an example of the class recognition system 106 training the class-recognition-machine-learning model 108 in accordance with one or more embodiments. As shown in FIG. 6, for instance, the class recognition system 106 generates training-class scores 610*a*-614*a* and 610*b*-614*b* corresponding to multiple training classes for training-term sequences from a training-source text respectively utilizing an implicit-class-recognition model 604 and an explicit-class-recognition model 610. The class recognition system 106 further applies (i) a first max pooling layer 616 to consolidate the training-class scores for the training-term sequences and (ii) a second max pooling layer 624 to the consolidated-class scores to determine training-class score for a training class corresponding to a training-term sequence.

Consistent with the disclosure above, the class recognition system 106 uses the implicit-class-recognition model 604 and the explicit-class-recognition model 610 to respectively generate the training-class scores 610*a*-614*a* and 610*b*-614*b* by using any of the analyses or architecture described for the class recognition system 106 with respect to FIGS. 2, 3, 4, and 5A-5C. To clarify that FIG. 6 depicts training the class-recognition-machine-learning model 108, this disclosure refers to classes, class scores, a label, a feature vector, a similarity matrix, a source text, a term embedding, and term sequences, for purposes of training as training classes, training-class scores, a training label, a training-feature vector, a training-similarity matrix, a training-source text, a training-term embedding, and training-term sequences.

As depicted in FIG. 6, the class recognition system 106 applies the implicit-class-recognition model 604 to training-term sequences from a training-source text 602. By applying the implicit-class-recognition model 604 to the training-source text 602, the class recognition system 106 applies bi-directional LSTM layers 606 and a convolutional neural network 608. In some embodiments, for example, the class recognition system 106 applies the bi-directional LSTM layers 606 to training-term embeddings corresponding to training terms from the training-source text 602. Based on the training-term embeddings, the bi-directional LSTM layers 606 generate training-feature vectors for the training terms.

After generating the training-feature vectors for individual training source terms, the class recognition system 106 uses the convolutional neural network 608 to generate the training-class scores 610*a*, 612*a*, and 614*a*. For example, in some cases, the class recognition system 106 applies a convolutional filter to each training-feature vector for each training term from the training-source text 602. For each training class from multiple training classes, the class recognition system 106 can apply a one-dimensional convolutional filter to each training-feature vector. Based on applying such a class-specific-convolutional filter to each training-feature vector, in some embodiments, the implicit-class-recognition model 604 outputs training-class scores corresponding to multiple training classes for training-term sequences within the training-source text 602.

For simplicity, FIG. 6 depicts the training-class scores 610*a*, 612*a*, and 614*a* after the class recognition system 106 applies a max pooling layer within the implicit-class-recognition model 604 to preliminary training-class scores. As suggested above, the class recognition system 106 can generate the training-class scores 610*a*, 612*a*, and 614*a* consistent with the architecture and outputs shown in FIG. 4. Accordingly, in some embodiments, the training-class scores 610*a*, 612*a*, and 614*a* constitute preliminary consolidated-training-class scores.

In addition to applying the implicit-class-recognition model 604, the class recognition system 106 further applies the explicit-class-recognition model 610 to generate training-class scores 610*b*, 612*b*, and 614*b* corresponding to multiple training classes for training-term sequences from the training-source text 602. By applying the explicit-class-recognition model 610, the class recognition system 106 applies a similarity matrix generator 612 and a convolutional neural network 614.

In certain implementations, for instance, the class recognition system 106 uses the similarity matrix generator 612 to generate training similarity matrices based on (i) training terms from the training-source text 602 and (ii) training labels corresponding to multiple training classes. For each training label for a training class, for example, the class recognition system 106 can generate a training-similarity matrix comprising training similarity scores between source-term-feature vectors for the training terms from the training-source text 602 and label-feature vectors for a training label corresponding to a training class.

As further indicated by FIG. 6, the class recognition system 106 uses the convolutional neural network 614 to analyze the training similarity matrices generated by the similarity matrix generator 612. For example, in some embodiments, the class recognition system 106 applies convolutional filters to training similarity scores from the training similarity matrices. Based on the training similarity matrices as inputs, the convolutional neural network 614 outputs training-class scores 610*b*, 612*b*, and 614*b*. As suggested above, in some embodiments, the training-class scores 610*a*-610*b*, 612*a*-612*b*, and 614*a*-614*b* respectively correspond to unigram training-class scores, bigram training-class scores, and trigram training-class scores.

For simplicity, FIG. 6 depicts the training-class scores 610*b*, 612*b*, and 614*b* after the class recognition system 106 applies two max pooling layers within the explicit-class-recognition model 610 to preliminary training-class scores. As suggested above, the class recognition system 106 can generate the training-class scores 610*b*, 612*b*, and 614*b* consistent with the architecture and outputs shown in FIGS. 5A-5C. Accordingly, in some embodiments, the training-class scores 610*b*, 612*b*, and 614*b* constitute refined-consolidated-training-class scores.

As further shown in FIG. 6, the class recognition system 106 further applies the first max pooling layer 616 to consolidate (i) the training-class scores 610*a* and 610*b*, (ii) the training-class scores 612*a* and 612*b*, and (iii) the training-class scores 614*a* and 614*b*. By applying the first max pooling layer 616, for instance, the class recognition system 106 selects a highest training-class score for each training-term sequence corresponding to a training class to generate consolidated-training-class scores 618, 620, and 622. Accordingly, in some cases, the consolidated-training-class scores 618, for example, represent the highest class scores both per term sequence and per class from among the training-class scores 610*a* and 610*b*.

After applying the first max pooling layer 616, the class recognition system 106 further applies the second max pooling layer 624 to the consolidated-training-class scores 618, 620, and 622. By applying the second max pooling layer 624, the class recognition system 106 selects a highest training-class score corresponding to each training class from among the consolidated-training-class scores 618, 620, and 622. As shown in FIG. 6, the class recognition system 106 selects training-class scores 626*a* and 626*b*, for example, as the highest training-class scores corresponding to different training classes. The training-class scores 626*a* and 626*b* are merely illustrative. In some embodiments, the class recognition system 106 trains the class-recognition-machine-learning model 108 using more than two training classes and accordingly applies the second max pooling layer 624 to select more than two highest training-class scores.

As further indicated by FIG. 6, the class recognition system 106 subsequently identifies the training-class score 626a indicating a training-term sequence corresponds to a training class. For example, in some embodiments, the class recognition system 106 identifies the training-class score 626a as the highest training-class score (or equal to the highest class score) from among the training-class scores 626a and 626b. Additionally, or alternatively, the class recognition system 106 determines that the training-class score 626a satisfies a threshold class score as a basis for selecting the training-class score 626a.

As further shown in FIG. 6, the class recognition system 106 compares the training-class score 626a to a ground-truth class 632 corresponding to the training-source text 602. For instance, the class recognition system 106 uses a loss function 630 to determine a loss 634 based on a comparison of the training-class score 626a and the ground-truth class 632. In some cases, the class recognition system 106 uses a least-squared-error function as the loss function 630. Alternatively, in certain implementations, the class recognition system 106 uses a cross-entropy-loss function, a mean-squared-error function, or other suitable loss function as the loss function 630.

Additionally, or alternatively, in some embodiments, the class recognition system 106 determines a training class corresponding to the training-class score 626a. Accordingly, in some cases, the class recognition system 106 uses the loss function 630 to determine the loss 634 based on a comparison of a training class corresponding to the training-class score 626a and the ground-truth class 632. But the class recognition system 106 can be designed to compare either training class to ground-truth class or training-class score to ground-truth class.

Upon determining a loss from the loss function 630, the class recognition system 106 modifies internal parameters (e.g., weights or values) of the class-recognition-machine-learning model 108 to decrease a loss for the loss function 630 in a subsequent training iteration using back propagation—as shown by the arrow from the loss 634 to the class-recognition-machine-learning model 108. For example, the class recognition system 106 may increase or decrease weights or values from some (or all) of the implicit-class-recognition model 604 and the explicit-class-recognition model 610 to decrease or minimize a loss in a subsequent training iteration.

As suggested above, FIG. 6 illustrates an initial training iteration of the class recognition system 106 training the class-recognition-machine-learning model 108. In a subsequent training iteration, the class recognition system 106 likewise generates training-class scores corresponding to multiple training classes for training-term sequences from an additional training-source text respectively utilizing the implicit-class-recognition model 604 and the explicit-class-recognition model 610. The class recognition system 106 further applies (i) the first max pooling layer 616 to consolidate the training-class scores for the training-term sequences from the additional training-source text and (ii) the second max pooling layer 624 to the consolidated-class scores to determine or predict a training class corresponding to a training-term sequence from the additional training-source text.

By iteratively determining losses from a comparison of a predicted training class and a ground-truth class—or a training-class score and the ground-truth class—the class recognition system 106 trains the class-recognition-machine-learning model 108 to classify particular term sequences from source texts. In some cases, the class recognition system 106 performs training iterations until the value or weights of the class-recognition-machine-learning model 108 do not change significantly across training iterations or otherwise satisfy a convergence criteria.

Figure 7A:
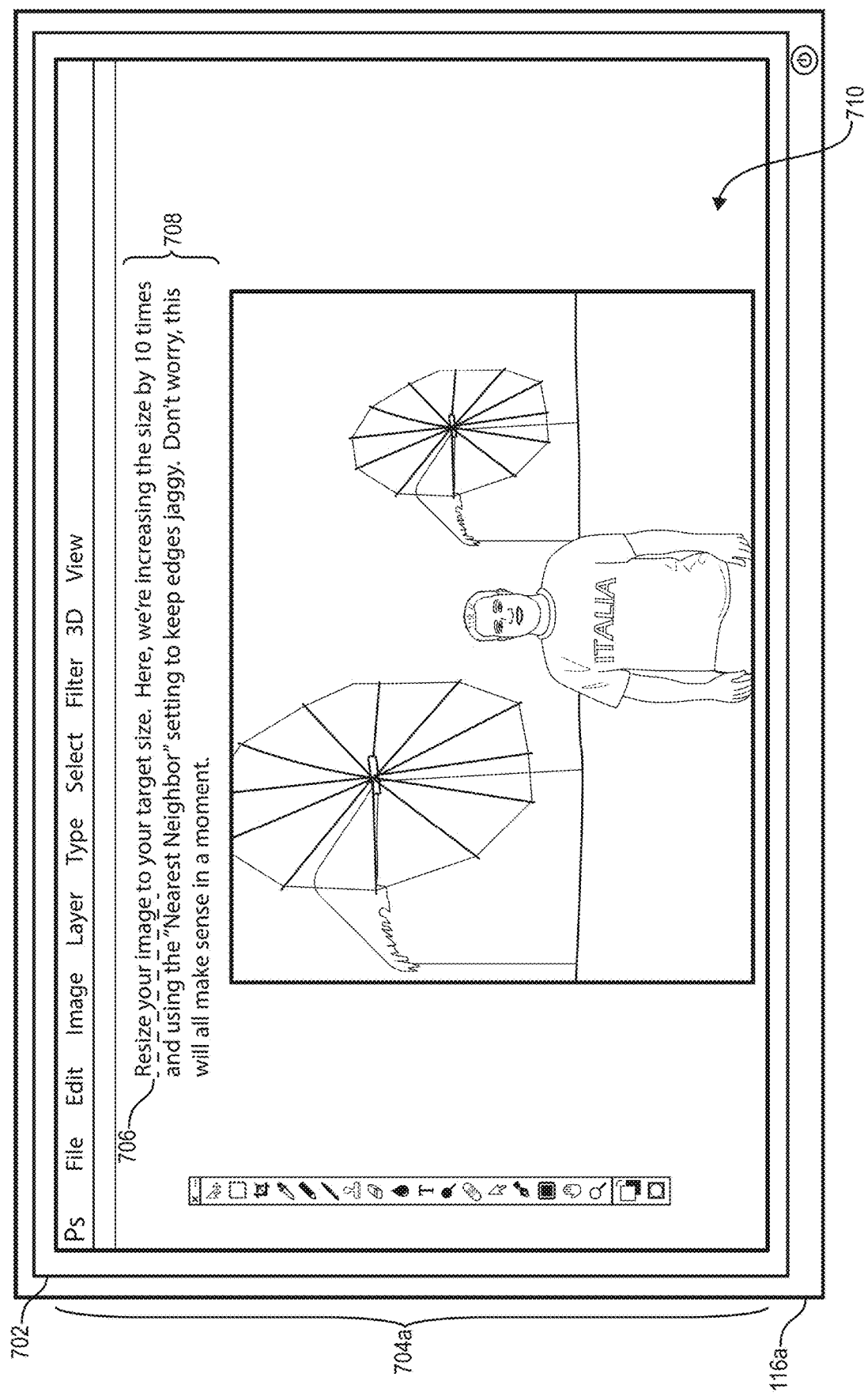
FIGS. 7A-7B illustrate a computing device presenting graphical user interfaces comprising a source text and a visual indicator identifying a term sequence as corresponding to a class in accordance with one or more embodiments.
Figure 7B:
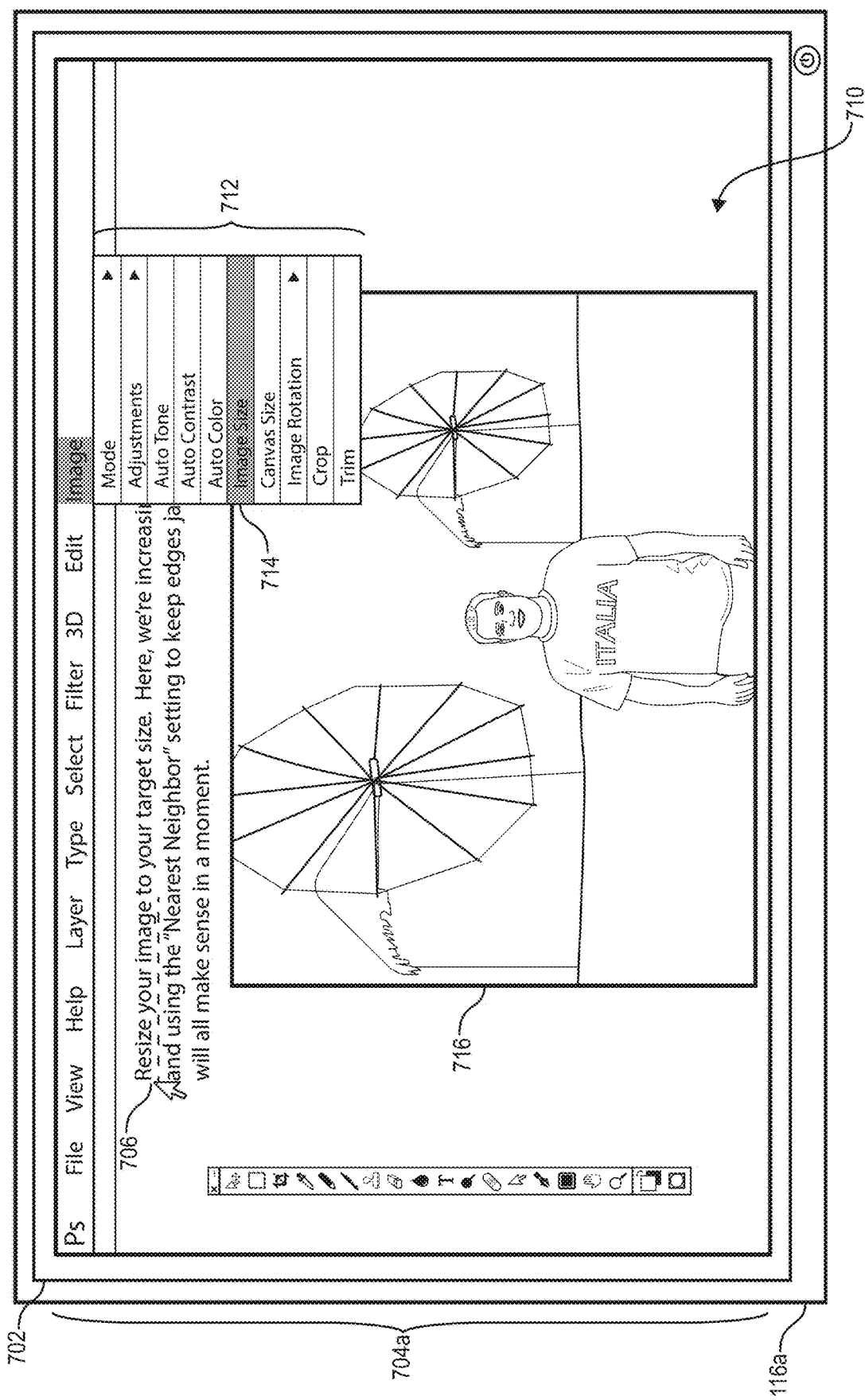

In addition (or in the alternative) to training the class-recognition-machine-learning model 108, the class recognition system 106 can further apply and visualize classifications from the class-recognition-machine-learning model 108. As indicated above, in certain embodiments, the class recognition system 106 provides a source text and a visual indicator identifying a term sequence in the source text (as corresponding to a class) for display within a graphical user interface. For example, FIGS. 7A-7B illustrate the client device 116a presenting graphical user interfaces comprising a source text and a visual indicator identifying a term sequence as corresponding to a class in accordance with one or more embodiments. As described below, FIGS. 7A-7B depict graphical user interfaces from the perspective of the client device 116a implementing computer-executable instructions of the content application 118a to perform certain actions for the class recognition system 106.

As shown in FIG. 7A, for instance, the client device 116a presents a graphical user interface 704a of the content application 118a within a screen 702. The graphical user interface 704a includes a source text 708 presented within a digital document 710. In some embodiments, the class recognition system 106 identifies the source text 708 within the digital document 710 based on a search query from the client device 116a, a request to render the digital document 710 from the client device 116a, or a rendering of a video corresponding to an audio transcription on the client device 116a.

Accordingly, in some embodiments, the digital document 710 corresponds to an audio file or a video file. The digital content system 104 may retrieve the digital document 710 corresponding to the audio file or the video file after applying automatic speech recognition ("ASR") to transcribe the audio to text. Additionally, or alternatively, the digital document 710 may comprise a tutorial for a software tool that the digital content system 104 retrieves in response to a search query. The digital content system 104 may search a collection of tutorials based on such a search query and provide the digital document 710 with the visual indicator 706 in response to the search query.

Consistent with the disclosure above, the class recognition system 106 generates a first plurality of class scores and a second plurality of class scores corresponding to multiple classes for term sequences from the source text 708 respectively utilizing an implicit-class-recognition model and an explicit-class-recognition model. Based on the first plurality of class scores and the second plurality of class scores, the class recognition system 106 determines a class (from the multiple classes) corresponding to the source text 708 and a term sequence from the source text 708 reflecting the class.

Based on identifying the class and the term sequence, the class recognition system 106 provides the source text 708 and a visual indicator 706 identifying the term sequence in the source text 708 (as corresponding to the class) for display within the graphical user interface 704a. As shown in FIG. 7A, the visual indicator 706 identifies the term sequence. For example, the visual indicator 706 may indicate the term sequence corresponds to a software tool. Additionally, or alternatively, the class recognition system 106 provides a visual indicator that expressly identifies the class, such as by providing a bubble, flag, or other indicator expressly identifying the class by name (e.g., a named entity).

As further noted above, in some embodiments, the class recognition system 106 further refers or links selectable options to a term sequence corresponding to a class. FIG. 7B illustrates an example of such a link based on detecting a user interaction with a term sequence within a source text. As shown in FIG. 7B, for example, the client device 116a detects a user interaction with the term sequence corresponding to the class within the source text 708. In some embodiments, the client device 116a detects a mouse click, touch gesture, keyboard input, or other user interaction with the term sequence. Based on detecting the user interaction with the term sequence from the source text 708, the client device 116a presents an interactive menu 712 and a selectable option 714 corresponding to the class.

As indicated by FIG. 7B, the interactive menu 712 includes various options for modifying digital content. For example, in some embodiments, the interactive menu 712 includes selectable options for modifying a digital image 716 within the graphical user interface 704b. Among the selectable options, the interactive menu 712 includes the selectable option 714 corresponding to the class. Upon detecting a user selection of the selectable option 714, for example, the client device 116a may provide additional information concerning the class, software commands corresponding to the class, or automatically perform an action corresponding to the class (e.g., resizing the digital image 716).

As further indicated by FIG. 7B, in some implementations, a class corresponds to a named entity. In particular, the class recognition system 106 may identify that the term sequence within the source text 708 corresponds to a specific software tool by implicitly or expressly identifying the software tool. Based on detecting the user interaction with the term sequence, the class recognition system 106 accordingly provides an interactive menu and a selectable option corresponding to the software tool. The interactive menu may further include other selection options for additional software tools related to the software tool.

As noted above, the class recognition system 106 can utilize both an implicit-class-recognition model and an explicit-class-recognition model to accurately identify implicit references and explicit references to a class from a term sequence in a source text. To separately measure the accuracy of such an implicit-class-recognition model and an explicit-class-recognition model, researchers used (i) class scores from an implicit-class-recognition model to determine a class for source texts including both implicit references and explicit references to named entities and (ii) class scores from an explicit-class-recognition model to determine a class for source texts including both implicit references and explicit references to named entities.

Figure 8A:
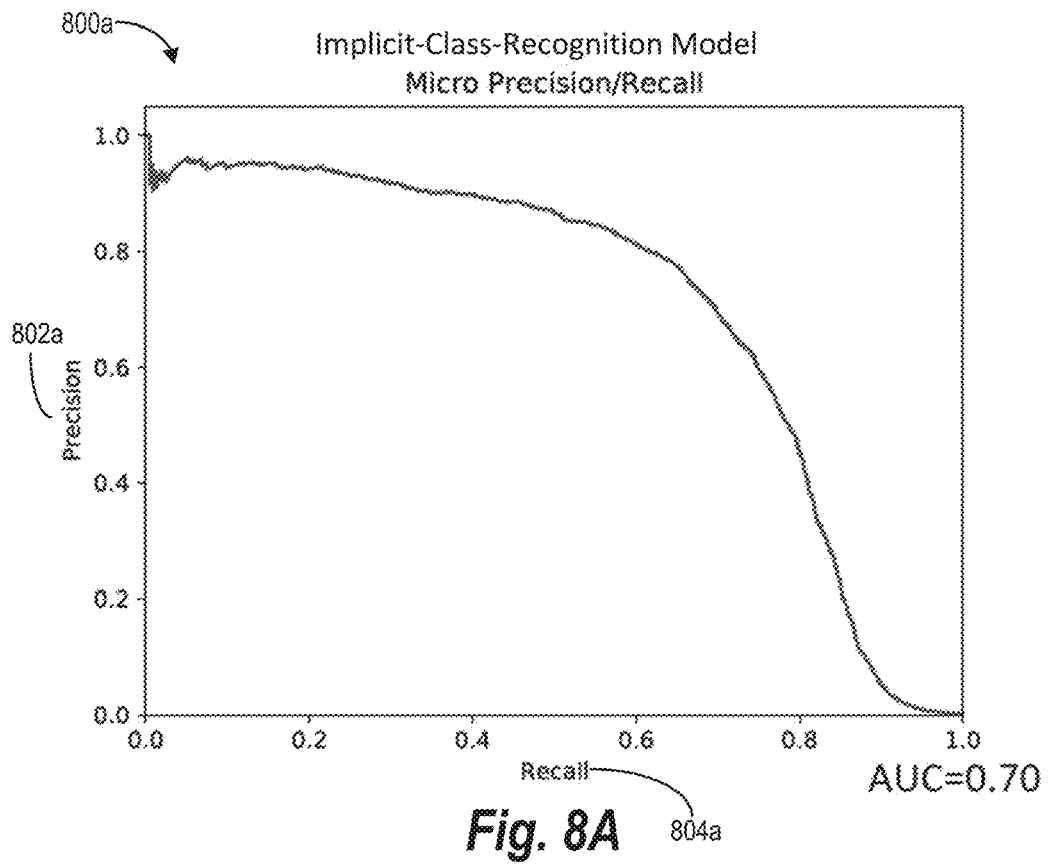
FIGS. 8A-8B illustrate precision-recall graphs for an implicit-class-recognition model and an explicit-class-recognition model in accordance with one or more embodiments.
Figure 8B:
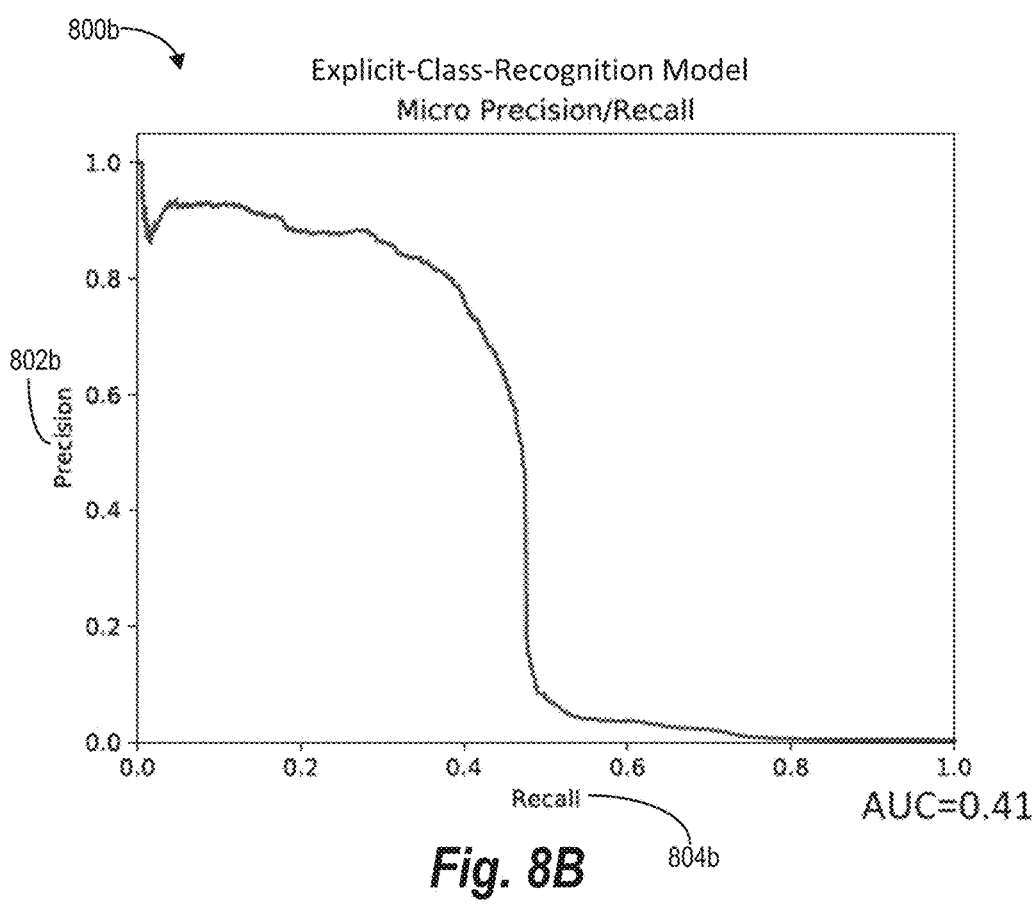

FIGS. 8A and 8B depict measurements of both precision and recall shown as precision-recall curves based on an implicit-class-recognition model and an explicit-class-recognition model in accordance with one or more embodiments. In particular, FIG. 8A illustrates a precision-recall graph 800a measuring the precision and recall of a class recognition system identifying a class corresponding to a term sequence in a source text based on class scores from an implicit-class-recognition model (without an explicit-class-recognition model). FIG. 8B illustrates a precision-recall graph 800b measuring the precision and recall of a class recognition system identifying a class corresponding to a term sequence in a source text based on class scores from an explicit-class-recognition model (without an implicit-class-recognition model).

As shown in FIGS. 8A and 8B, precision axes 802a and 802b indicate measurements of precision for the precision-recall graphs 800a and 800b, respectively. As further shown in FIGS. 8A and 8B, recall axes 804a and 804b indicate measurements of recall for the precision-recall graphs 800a and 800b, respectively. In both the precision-recall graphs 800a and 800b, "AUC" refers to area under the curve.

As indicated by the precision-recall graph 800a in FIG. 8A, a class recognition system can correctly identify a named entity from either an implicit or explicit reference to the named entity based on class scores from the implicit-class-recognition model. In other words, the implicit-class-recognition model facilitates both relatively high levels of precision and recall. As indicated by the precision-recall graph 800b in FIG. 8B, a class recognition system can also correctly identify a named entity from either an implicit or explicit reference to the named entity based on class scores from the explicit-class-recognition model—until the reference to the named entity becomes more inexact. As shown along the precision axis 802b and the recall axis 804b, the explicit-class-recognition model facilitates both relatively high levels of precision and recall until a decline beginning around a 0.5 value for recall.

Figure 8C:
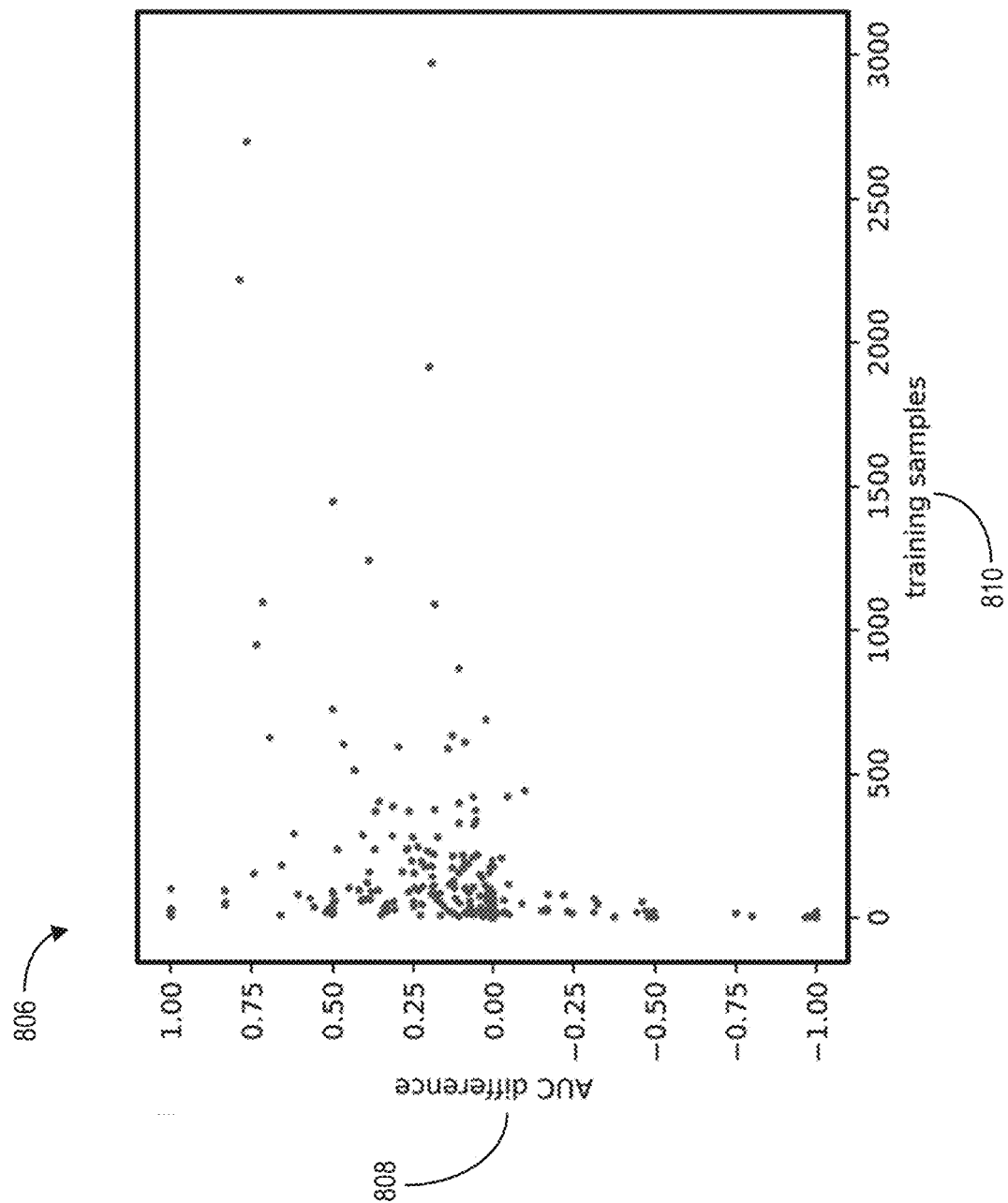
FIG. 8C illustrates a comparative precision-recall graph for an implicit-class-recognition model and an explicit-class-recognition model in accordance with one or more embodiments.

In addition to determining precision-recall curves to measure classification accuracy, researchers further compared the precision-recall curves for the implicit-class-recognition model and the explicit-class-recognition model. FIG. 8C illustrates a comparative precision-recall graph 806 comparing precision-recall curves for the implicit-class-recognition model and the explicit-class-recognition model in accordance with one or more embodiments. As shown in FIG. 8C, an AUC-difference axis 808 measures a difference between (i) the area under the precision-recall curve from the precision-recall graph 800a for the implicit-class-recognition model and (ii) the area under the precision-recall curve from the precision-recall graph 800b for the explicit-class-recognition model. By contrast, a training-samples axis 810 indicates a number of training samples of source texts upon which a class recognition system comprising either the implicit-class-recognition model or the explicit-class-recognition model was trained.

As shown in FIG. 8C, an AUC difference of 1.00 at the top of the AUC-difference axis 808 marks a point at which a class recognition system comprising the implicit-class-recognition model better identifies a named entity from term sequences within a source text than the explicit-class-recognition model. By contrast, an AUC difference of −1.00 at the bottom of the AUC-difference axis 808 marks a point at which a class recognition system comprising the explicit-class-recognition model better identifies a named entity from term sequences within a source text than the implicit-class-recognition model. Based on the AUC-difference axis 808, the comparative precision-recall graph 806 indicates that a class recognition system comprising the explicit-class-recognition model can accurately identify a named entity from term sequences within a source text when trained with little to no training-source texts. Notwithstanding a lack of training samples, the class recognition system can correctly identify a named entity from an explicit reference to the named entity based on class scores from the explicit-class-recognition model.

Based on the AUC-difference axis 808, the comparative precision-recall graph 806 indicates that a class recognition system comprising the implicit-class-recognition model can accurately identify a named entity from term sequences within a source text when trained with more training-source texts. As the number of training samples of source texts increases, the implicit-class-recognition model better identifies a named entity from an implicit reference to the named entity from a training-source text.

As indicated above, the class recognition system 106 also more accurately detects and classifies term sequences from source texts corresponding to classes of less common (or unavailable) training samples than existing text-classification systems. To compare such accuracy in classification, researchers used (i) an example embodiment of the class recognition system 106 comprising both an implicit-class-recognition model and an explicit-class-recognition model to determine a class for source texts including both implicit references and explicit references to named entities and (ii) an existing text-classification system to determine a class for source texts including both implicit references and explicit references to named entities.

Figure 9A:
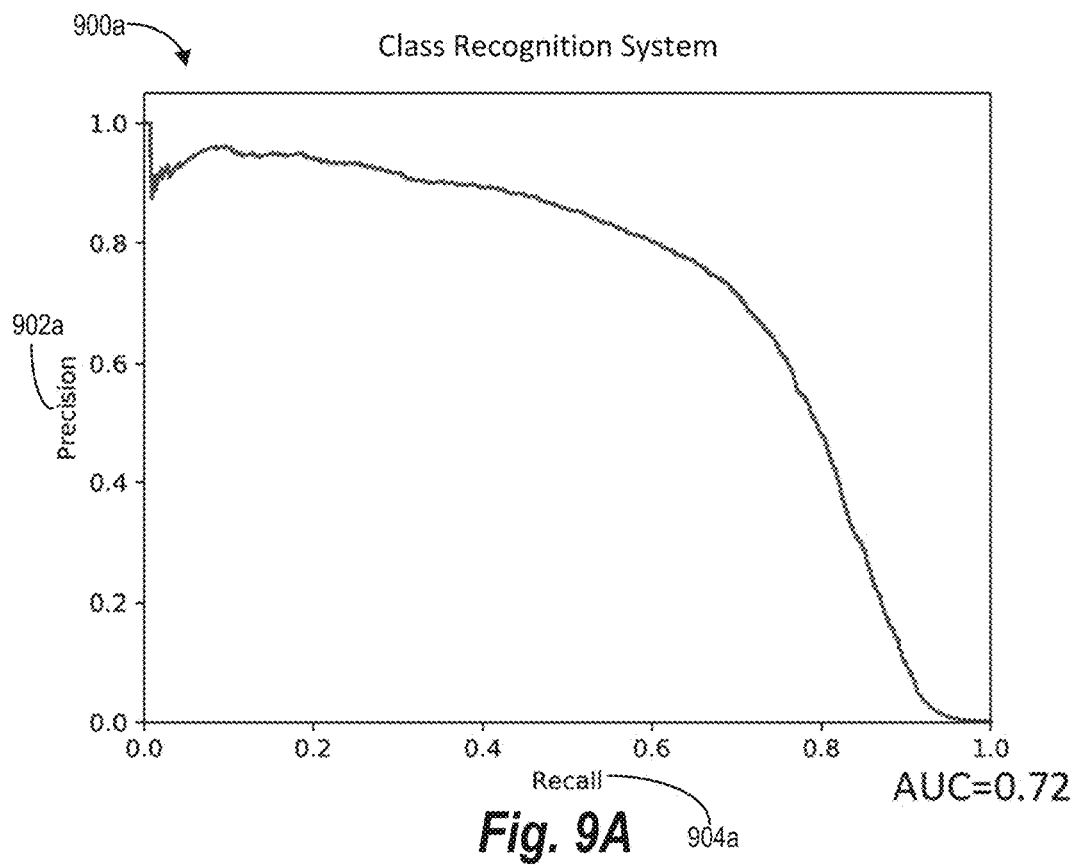
FIGS. 9A-9B illustrate precision-recall graphs for a class recognition system and an existing text-classification system in accordance with one or more embodiments.
Figure 9B:
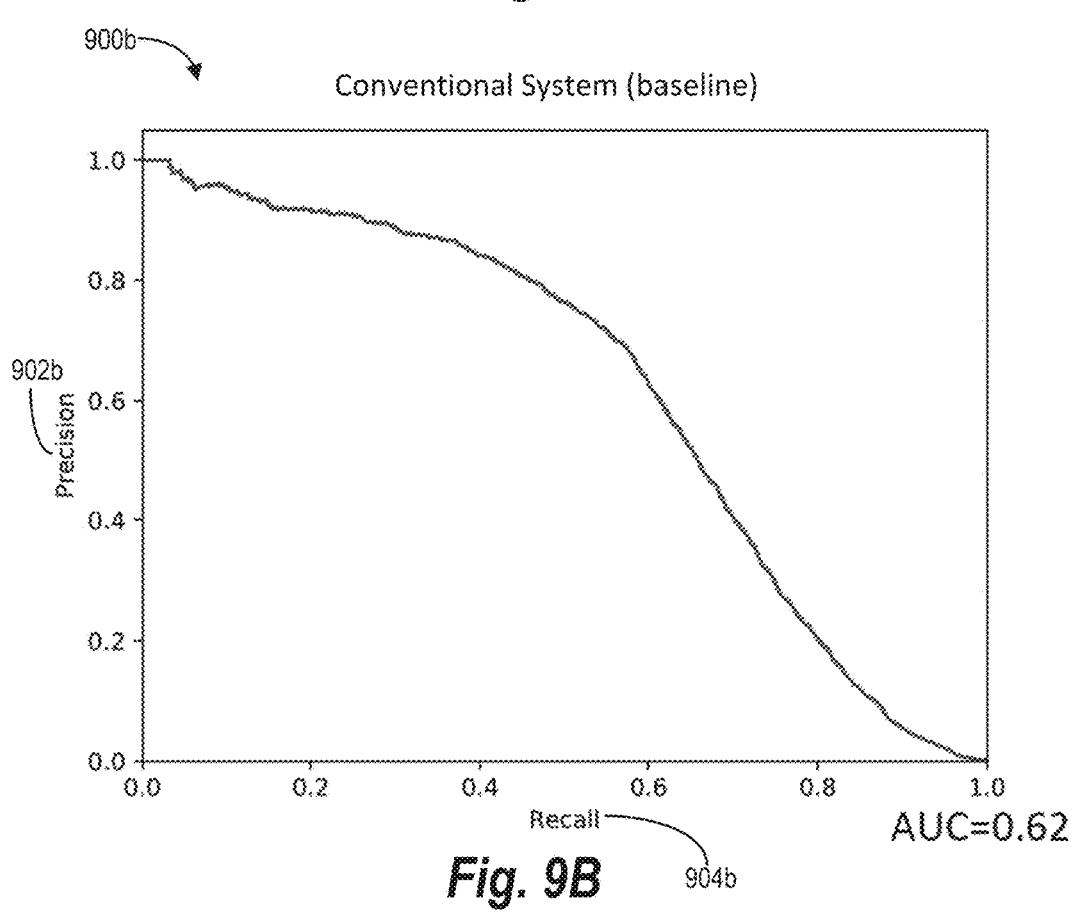

FIGS. 9A and 9B depict measurements of both precision and recall shown in precision-recall curves from the example embodiment of the class recognition system 106 and a conventional system. In particular, FIG. 9A illustrates a precision-recall graph 900a measuring the precision and recall of the class recognition system 106 identifying a class corresponding to a term sequence in a source text based on class scores from both an implicit-class-recognition model and an explicit-class-recognition model. FIG. 9B illustrates a precision-recall graph 900b measuring the precision and recall of the conventional system identifying a class corresponding to a term sequence in a source text.

As shown in FIGS. 9A and 9B, precision axes 902a and 902b indicate measurements of precision for the precision-recall graphs 900a and 900b, respectively. As further shown in FIGS. 9A and 9B, recall axes 904a and 904b indicate measurements of recall for the precision-recall graphs 900a and 900b, respectively. In both the precision-recall graphs 900a and 900b, "AUC" again refers to area under the curve.

As a comparison of the precision-recall graphs 900a and 900b indicates, the AUC of 0.72 for the example embodiment of the class recognition system 106 exceeds the AUC of 0.62 for the conventional system. Accordingly, the precision and recall for the example embodiment of the class recognition system 106 exceeds the precision and recall for the conventional system in classifying term sequences. In terms of precision and recall, therefore, the example embodiment of the class recognition system 106 more accurately detects and classifies term sequences from source texts corresponding to classes than conventional systems.

Figure 10:
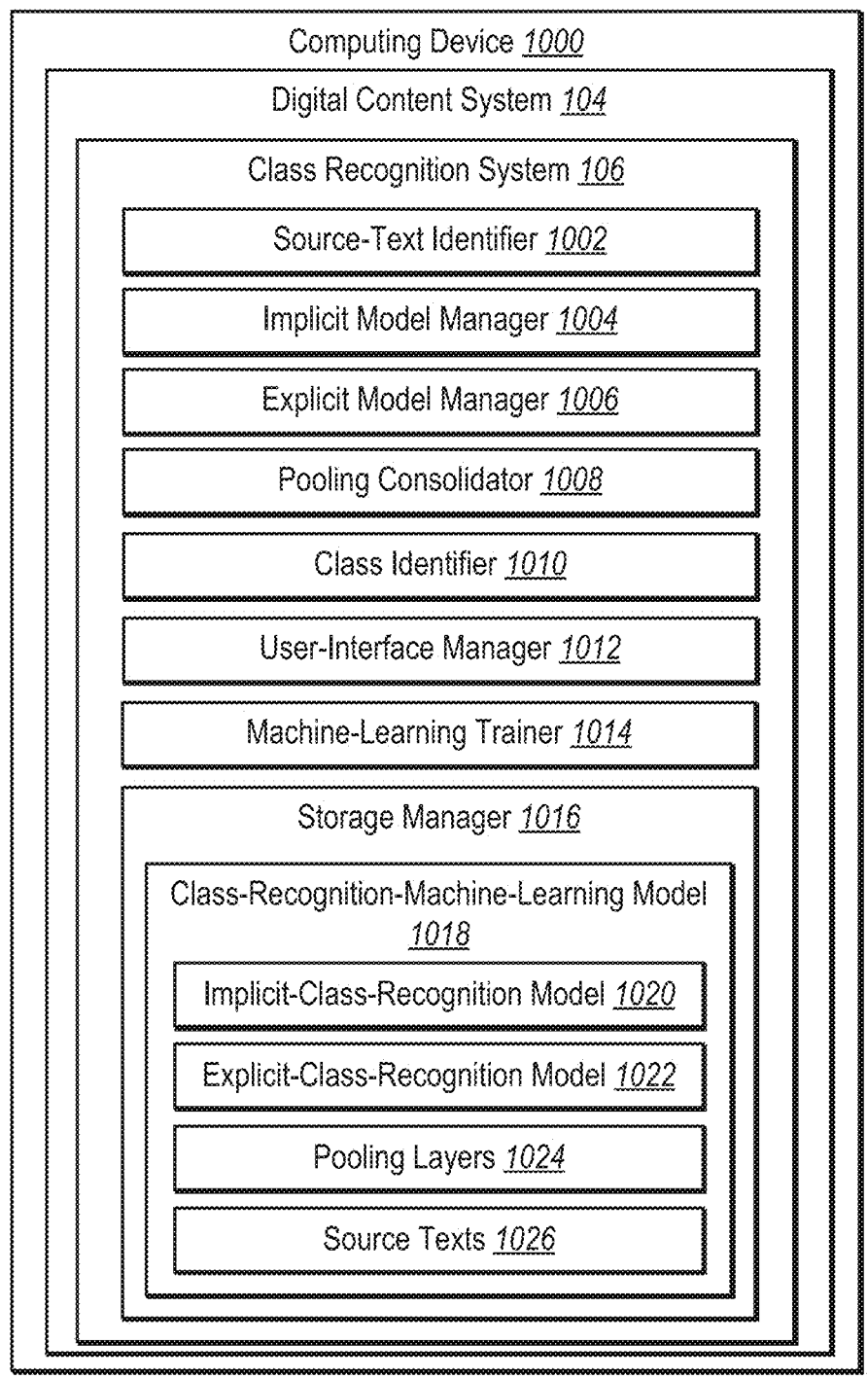
FIG. 10 illustrates a schematic diagram of the digital content system and the class recognition system of FIG. 1 in accordance with one or more embodiments.

Turning now to FIG. 10, this figure provides additional detail regarding components and features of the class recognition system 106. In particular, FIG. 10 illustrates a computing device 1000 implementing the digital content system 104 and the class recognition system 106. The computing device 1000 can include one or more servers (e.g., the server(s) 102) and/or one or more client devices (e.g., the client device 116a).

As shown in FIG. 10, the computing device 1000 includes the digital content system 104. In some embodiments, the digital content system 104 uses its components to perform various rendering, searching, modification, or other functions with regard to a digital document, video, or other digital content. Additionally, in some cases, the digital content system 104 facilitates annotations, displays, conversions, digital signatures, document generation, document edits, encryptions, document modifications, and document renderings based on requests from client devices.

As further shown in FIG. 10, the computing device 1000 includes the class recognition system 106. The class recognition system 106 includes, but is not limited to, a source-text identifier 1002, an implicit model manager 1004, an explicit model manager 1006, a pooling consolidator 1008, a class identifier 1010, a user-interface manager 1012, a machine-learning trainer 1014, and/or a storage manager 1016. The following paragraphs describe each of these components.

As just mentioned, the class recognition system 106 includes the source-text identifier 1002. The source-text identifier 1002 identifies source texts and term sequences from among source texts 1026. In some embodiments, for instance, the source-text identifier 1002 identifies a source text within a digital document based on a search query from a client device, a request to render the digital document from the client device, or a rendering of a video corresponding to an audio transcription on the client device. In certain cases, the source-text identifier 1002 parses source texts to identify unigrams, bigrams, trigrams, or other n-grams. Consistent with the disclosure above, the source-text identifier 1002 can further identify training-source texts during training iterations.

As further shown in FIG. 10, the class recognition system 106 includes the implicit model manager 1004. The implicit model manager 1004 applies, instructs, manages, feeds, and trains an implicit-class-recognition model 1020 as part of a class-recognition-machine-learning model 1018. Consistent with the disclosure above, the implicit model manager 1004 uses the implicit-class-recognition model 1020 to generate class scores (or training-class scores) corresponding to multiple classes for term sequences from a source text (or for training-term sequences from a training-source text). Accordingly, the implicit model manager 1004 can apply or facilitate training of the implicit-class-recognition model 1020 as depicted in FIGS. 2, 3, 4, and/or 6 and as described above.

As further shown in FIG. 10, the class recognition system 106 includes the explicit model manager 1006. The explicit model manager 1006 applies, instructs, manages, feeds, and trains an explicit-class-recognition model 1022 as part of the class-recognition-machine-learning model 1018. Consistent with the disclosure above, the explicit model manager 1006 uses the explicit-class-recognition model 1022 to generate class scores (or training-class scores) corresponding to multiple classes for term sequences from a source text (or for training-term sequences from a training-source text). Accordingly, the explicit model manager 1006 can apply or facilitate training of the explicit-class-recognition model 1022 as depicted in FIGS. 2, 3, 5A-5C, and/or 6 and as described above.

In addition to model managers, the class recognition system 106 includes the pooling consolidator 1008. The pooling consolidator 1008 applies, facilitates, and manages pooling layers 1024 within the class-recognition-machine-learning model 1018. For example, the pooling consolidator 1008 applies one or more max pooling layers from the pooling layers 1024 to consolidate class scores or training-class scores. Accordingly, the pooling consolidator 1008 can apply the pooling layers 1024 as depicted in FIGS. 2, 3, and/or 6.

As further shown in FIG. 10, the class recognition system 106 includes the class identifier 1010. The class identifier 1010 identifies or determines a class corresponding to a source text and a term sequence from the source text reflecting the class. For example, the class identifier 1010 may determine that a class score corresponding to a class (or a training-class score corresponding to a training class) satisfies a threshold class score. The class identifier 1010 can also identify a highest class score (or a highest training-class score) from among consolidated-class scores (or from among consolidated-training-class scores) as a basis for determining a class corresponds to a term sequence.

As further shown in FIG. 10, and as its name suggests, the user-interface manager 1012 generates data for graphical user interfaces and/or provides data representing source texts, term sequences, and visual indicators for term sequences. For example, the user-interface manager 1012 provides data representing a source text and a visual indicator identifying the term sequence in the source text (as corresponding to the class) for display within a graphical user interface. In some implementations, the user-interface manager 1012 can generate data for the graphical user interfaces depicted in FIGS. 7A-7B, including visual indicators, interactive menus, and selectable options corresponding to a class.

In addition (or in the alternative) to applying the class-recognition-machine-learning model 1018, the class recognition system 106 can train the class-recognition-machine-learning model 1018. As shown in FIG. 10, the class recognition system 106 further includes the machine-learning trainer 1014. The machine-learning trainer 1014 facilitates training of the class-recognition-machine-learning model 1018 in conjunction with the implicit model manager 1004, the explicit model manager 1006, and other components of the class recognition system 106. For example, the machine-learning trainer 1014 feeds or provides training-source texts to the class-recognition-machine-learning model 1018 and determines a point of convergence for training iterations of the class-recognition-machine-learning model 1018. In some embodiments, the machine-learning trainer 1014 (i) communicates with the implicit model manager 1004 to modify internal parameters of the implicit-class-recognition model 1020 based on a determined loss in a training iteration and (ii) communicates with the explicit model manager 1006 to modify internal parameters of the explicit-class-recognition model 1022 based on a determined loss.

As suggested above, the storage manager 1016 accesses and stores data and models for the class recognition system 106. For example, the storage manager 1016 can communicate with one or more of the source-text identifier 1002, the implicit model manager 1004, the explicit model manager 1006, the pooling consolidator 1008, the class identifier 1010, the user-interface manager 1012, or the machine-learning trainer 1014 to access and provide data corresponding to the class-recognition-machine-learning model 1018, the implicit-class-recognition model 1020, the explicit-class-recognition model 1022, the pooling layers 1024, or the source texts 1026 stored on a storage medium.

Each of the components 1002-1026 of the class recognition system 106 can include software, hardware, or both. For example, the components 1002-1026 can include one or more instructions stored on a computer-readable storage medium and executable by processors of one or more computing devices, such as a client device or server device. When executed by the one or more processors, the computer-executable instructions of the class recognition system 106 can cause the computing device(s) to perform the methods described herein. Alternatively, the components 1002-1026 can include hardware, such as a special-purpose processing device to perform a certain function or group of functions. Alternatively, the components 1002-1026 of the class recognition system 106 can include a combination of computer-executable instructions and hardware.

Furthermore, the components 1002-1026 of the class recognition system 106 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 1002-1026 may be implemented as a stand-alone application, such as a desktop or mobile application. Furthermore, the components 1002-1026 may be implemented as one or more web-based applications hosted on a remote server. The components 1002-1026 may also be implemented in a suite of mobile device applications or "apps." To illustrate, the components 1002-1026 may be implemented in a software application, including, but not limited to, ADOBE ANALYTICS, ADOBE ILLUSTRATOR, ADOBE EXPERIENCE DESIGN, ADOBE CREATIVE CLOUD, ADOBE PHOTOSHOP, ADOBE EXPERIENCE CLOUD, and ADOBE SENSEI. "ADOBE," "ANALYTICS," "EXPERIENCE CLOUD," "EXPERIENCE DESIGN," "CREATIVE CLOUD," "ILLUSTRATOR," "PHOTOSHOP," and "SENSEI" are either registered trademarks or trademarks of Adobe Inc. in the United States and/or other countries.

Figure 11:
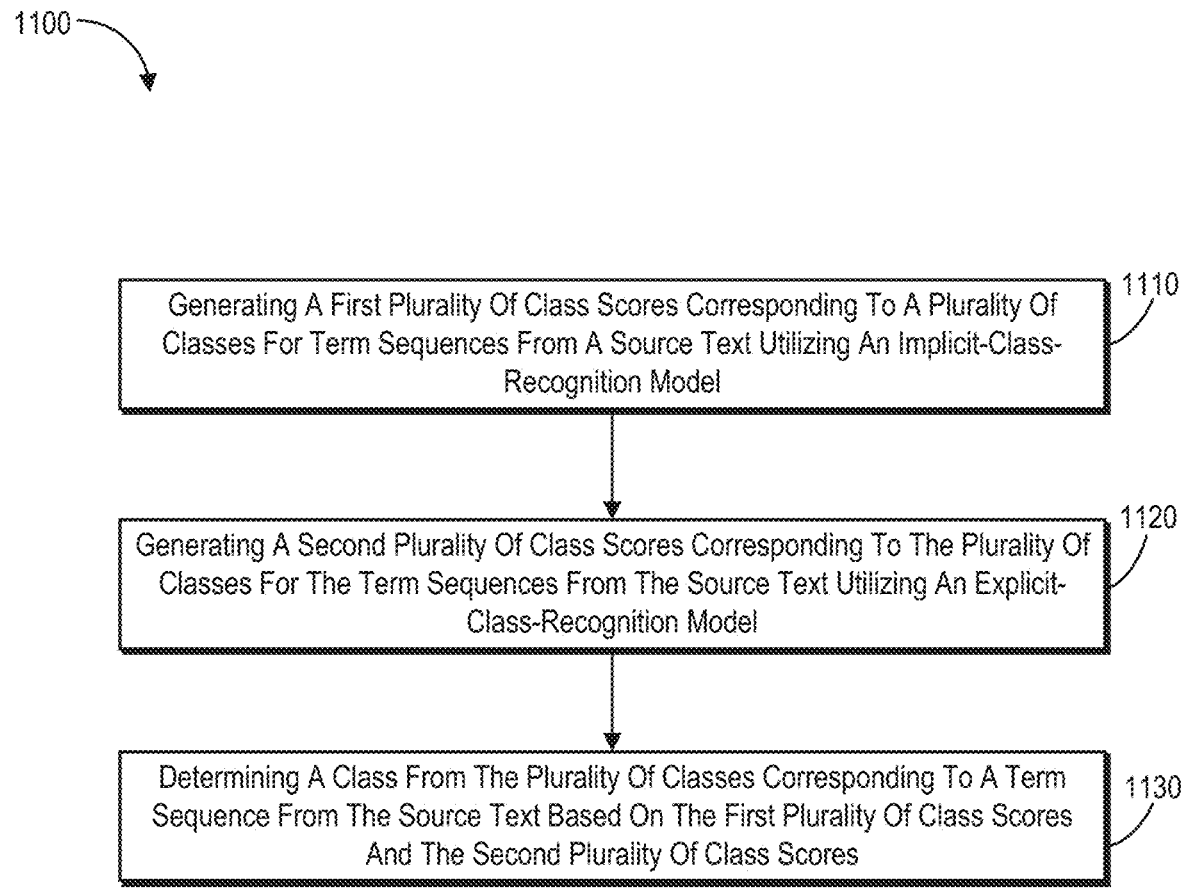
FIG. 11 illustrates a flowchart of a series of acts for determining classes corresponding to term sequences from source texts using an implicit-class-recognition model and an explicit class-recognition model in accordance with one or more embodiments.

Turning now to FIG. 11, this figure illustrates a flowchart of a series of acts 1100 of determining classes corresponding to term sequences from source texts using an implicit-class-recognition model and an explicit-class-recognition model in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable storage medium can comprise instructions that, when executed by one or more processors, cause a computing device to perform the acts depicted in FIG. 11. In still further embodiments, a system can perform the acts of FIG. 11.

As shown in FIG. 11, the acts 1100 include an act 1110 of generating a first plurality of class scores corresponding to a plurality of classes for term sequences from a source text utilizing an implicit-class-recognition model. In particular, in some embodiments, the act 1110 includes generating a first plurality of class scores corresponding to a plurality of classes for term sequences from a source text utilizing an implicit-class-recognition model, wherein the first plurality of class scores indicates a measure of likelihood that the term sequences from the source text correspond to the plurality of classes. In some cases, generating the first plurality of class scores comprises generating a first set of unigram class scores, a first set of bigram class scores, and a first set of trigram class scores utilizing the implicit-class-recognition model. As suggested above, in certain cases, the term sequences from the source text comprise unigrams, bigrams, and trigrams.

As noted above, in some embodiments, the implicit-class-recognition model comprises a plurality of long-short-term memory layers and a first convolutional neural network. For example, in certain implementations, generating the first plurality of class scores for the term sequences from the source text utilizing the implicit-class-recognition model comprises: generating a plurality of feature vectors based on terms from the source text utilizing a plurality of long-short-term memory ("LSTM") layers from the implicit-class-recognition model; and generating the first plurality of class scores for the term sequences based on the plurality of feature vectors utilizing a convolutional neural network from the implicit-class-recognition model.

Relatedly, in certain implementations, generating the plurality of feature vectors comprises: generating a first feature vector for a first term embedding from a first term of the source text utilizing the plurality of LSTM layers; and generating a second feature vector for a second term embedding from a second term of the source text utilizing the plurality of LSTM layers; and generating the first plurality of class scores for the term sequences comprises utilizing the first convolutional neural network to generate a first unigram class score based on the first feature vector, generate a second unigram class score based on the second feature vector, and generate a bigram class score based on the first feature vector and the second feature vector.

As further shown in FIG. 11, the acts 1100 include an act 1120 of generating a second plurality of class scores corresponding to the plurality of classes for the term sequences from the source text utilizing an explicit-class-recognition model. In particular, in some embodiments, the act 1120 includes generating a second plurality of class scores corresponding to the plurality of classes for the term sequences from the source text utilizing an explicit-class-recognition model, wherein the second plurality of class scores indicates a measure of likelihood that the term sequences from the source text correspond to the plurality of classes. In some cases, generating the second plurality of class scores comprises generating a second set of unigram class scores, a second set of bigram class scores, and a second set of trigram class scores utilizing the explicit-class-recognition model.

For example, in certain implementations, generating the second plurality of class scores for the term sequences from the source text utilizing the explicit-class-recognition model comprises: generating similarity matrices based on terms from the source text and a plurality of labels corresponding to a plurality of classes; and analyzing the similarity matrices utilizing a convolutional neural network of the explicit-class-recognition model to generate the second plurality of class scores.

Relatedly, in some cases, generating the similarity matrices comprises: generating a first similarity matrix comprising similarity scores between source-term-feature vectors for the terms from the source text and label-feature vectors for a first label corresponding to a first class; and generating a second similarity matrix comprising similarity scores between the source-term-feature vectors for the terms from the source text and label-feature vectors for a second label corresponding to a second class.

As noted above, in some implementations, the explicit-class-recognition model comprises a second convolutional neural network for multiple channels. Further, in one or more embodiments, generating the second plurality of class scores for the term sequences from the source text utilizing the explicit-class-recognition model comprises: generating term frequency measures for the terms within the source text and within the plurality of labels; and analyzing the term frequency measures and the similarity matrices utilizing the second convolutional neural network to generate the second plurality of class scores.

As further shown in FIG. 11, the acts 1100 include an act 1130 of determining a class from the plurality of classes corresponding to a term sequence from the source text based on the first plurality of class scores and the second plurality of class scores. In particular, in certain implementations, the act 1130 includes determining a class from the plurality of classes corresponding to the source text and a term sequence from the source text reflecting the class based on the first plurality of class scores and the second plurality of class scores. Further, in some embodiments, the act 1130 includes determining a class corresponding to a term sequence from the source text reflecting the class based on the first plurality of class scores and the second plurality of class scores. In some cases, the term sequence comprises one of a unigram, a bigram, or a trigram.

In addition to the acts 1110-1130, in certain implementations, the acts 1100 further include applying a max pooling layer to the first plurality of class scores and the second plurality of class scores to generate consolidated-class scores for the term sequences; and identifying the class and the term sequence based on the consolidated-class scores. Further, in one or more embodiments, the acts 1100 further include identifying the source text from a digital document and a plurality of classes.

In some cases, the acts 1100 further include providing the digital document for display within a graphical user interface comprising the source text and an indication of the term sequence corresponding to the class within the source text. Relatedly, in one or more embodiments, the acts 1100 further include providing, for display within a graphical user interface of a computing device, the source text and a visual indicator identifying the term sequence in the source text as corresponding to the class.

As further suggested above, in some cases, the acts 1100 further include training the implicit-class-recognition model and the explicit-class-recognition model by: applying an additional max pooling layer to the consolidated-class scores to determine the class; and comparing the class to a ground-truth class to modify internal parameters of the implicit-class-recognition model and the explicit-class-recognition model.

In addition (or in the alternative) to the acts described above, in some embodiments, the acts 1100 include performing a step for determining a class from the plurality of classes and a term sequence corresponding to the class from the source text utilizing an implicit-class-recognition model and an explicit-class-recognition model. For instance, the algorithms and acts described in relation to FIG. 3 can comprise the corresponding acts for a step for determining a class from the plurality of classes and a term sequence corresponding to the class from the source text utilizing an implicit-class-recognition model and an explicit-class-recognition model.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 12:
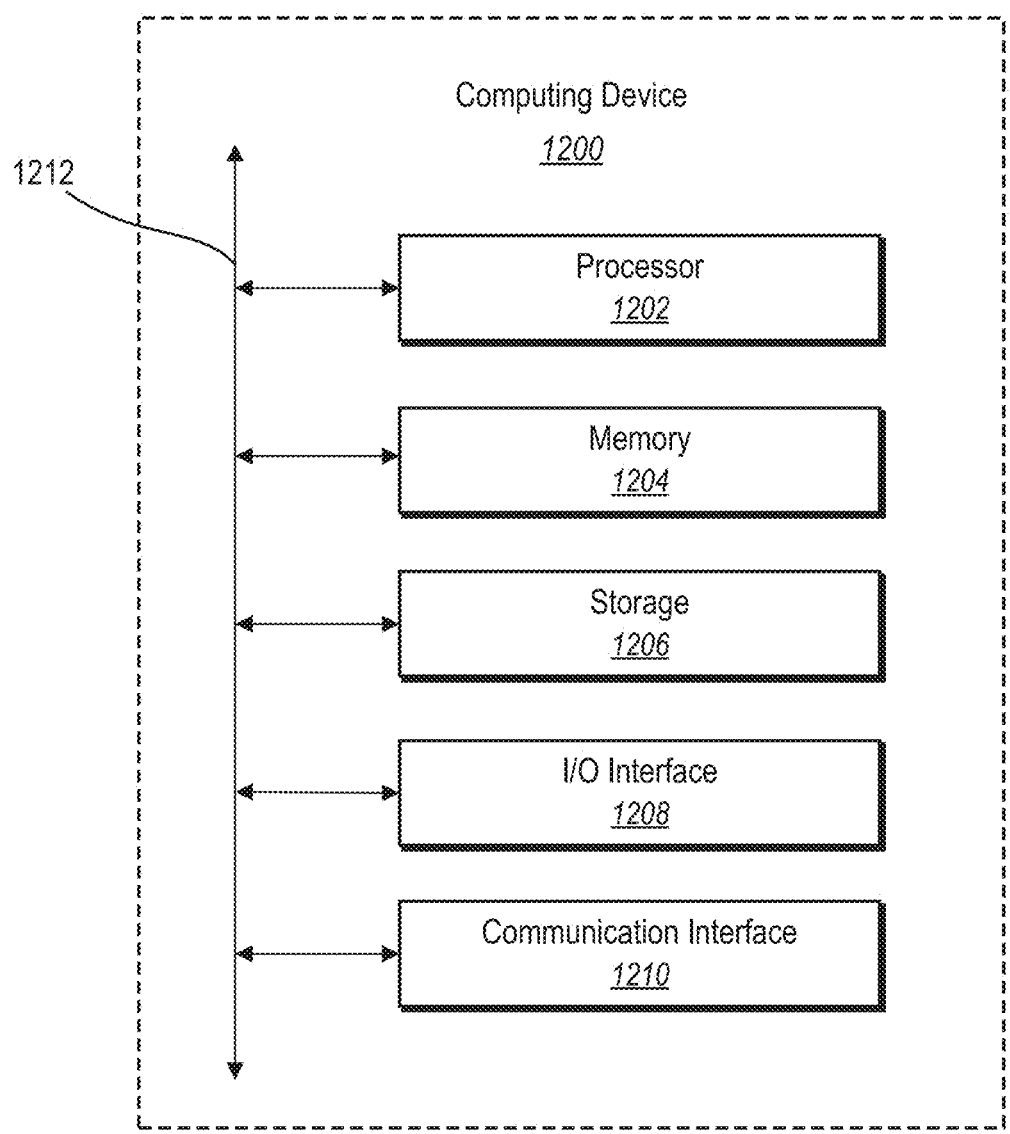
FIG. 12 illustrates a block diagram of an exemplary computing device for implementing one or more embodiments of the present disclosure.

FIG. 12 illustrates a block diagram of exemplary computing device 1200 that may be configured to perform one or more of the processes described above. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for digitizing real-world objects, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions related to object digitizing processes (e.g., digital scans, digital models).

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause the at least one processor to:
   generate a first plurality of n-gram class scores corresponding to a plurality of classes for term sequences from a source text utilizing an implicit-class-recognition model;
   generate a second plurality of n-gram class scores corresponding to the plurality of classes for the term sequences from the source text utilizing an explicit-class-recognition model,
   wherein the first plurality of n-gram class scores and the second plurality of n-gram class scores indicate measures of likelihood that the term sequences from the source text correspond to the plurality of classes; and
   determine a class from the plurality of classes corresponding to the source text and a term sequence from the source text reflecting the class based on the first plurality of n-gram class scores and the second plurality of n-gram class scores.

2. The non-transitory computer readable medium of claim 1, wherein the instructions, when executed by the at least one processor, cause the at least one processor to:
   generate the first plurality of n-gram class scores by generating a first set of unigram class scores, a first set of bigram class scores, and a first set of trigram class scores utilizing the implicit-class-recognition model; and
   generate the second plurality of n-gram class scores by generating a second set of unigram class scores, a second set of bigram class scores, and a second set of trigram class scores utilizing the explicit-class-recognition model.

3. The non-transitory computer readable medium of claim 1, wherein the instructions, when executed by the at least one processor, cause the at least one processor to:
   apply a max pooling layer to the first plurality of n-gram class scores and the second plurality of n-gram class scores to generate consolidated-class scores for the term sequences; and
   identify the class and the term sequence based on the consolidated-class scores.

4. The non-transitory computer readable medium of claim 1, wherein the instructions, when executed by the at least one processor, cause the at least one processor to generate the first plurality of n-gram class scores for the term sequences from the source text utilizing the implicit-class-recognition model by:
   generating a plurality of feature vectors based on terms from the source text utilizing a plurality of long-short-term memory ("LSTM") layers from the implicit-class-recognition model; and
   generating the first plurality of n-gram class scores for the term sequences based on the plurality of feature vectors utilizing a convolutional neural network from the implicit-class-recognition model.

5. The non-transitory computer readable medium of claim 4, wherein the instructions, when executed by the at least one processor, cause the at least one processor to:
   generate the plurality of feature vectors by:
      generating a first feature vector for a first term embedding from a first term of the source text utilizing the plurality of LSTM layers; and
      generating a second feature vector for a second term embedding from a second term of the source text utilizing the plurality of LSTM layers; and generate the first plurality of n-gram class scores for the term sequences by utilizing the convolutional neural network to generate a first unigram class score based on the first feature vector, generate a second unigram class score based on the second feature vector, and generate a bigram class score based on the first feature vector and the second feature vector.

6. The non-transitory computer readable medium of claim 1, wherein the instructions, when executed by the at least one processor, cause the at least one processor to generate the second plurality of n-gram class scores for the term sequences from the source text utilizing the explicit-class-recognition model by:
generating similarity matrices based on terms from the source text and a plurality of labels corresponding to a plurality of classes; and
analyzing the similarity matrices utilizing a convolutional neural network of the explicit-class-recognition model to generate the second plurality of n-gram class scores.

7. The non-transitory computer readable medium of claim 6, wherein the instructions, when executed by the at least one processor, cause the at least one processor to generate the similarity matrices by:
generating a first similarity matrix comprising similarity scores between source-term-feature vectors for the terms from the source text and label-feature vectors for a first label corresponding to a first class; and
generating a second similarity matrix comprising similarity scores between the source-term-feature vectors for the terms from the source text and label-feature vectors for a second label corresponding to a second class.

8. The non-transitory computer readable medium of claim 1, wherein the instructions, when executed by the at least one processor, cause the at least one processor to provide, for display within a graphical user interface of a computing device, the source text and a visual indicator identifying the term sequence in the source text as corresponding to the class.

9. The non-transitory computer readable medium of claim 1, wherein:
the term sequences from the source text comprise unigrams, bigrams, and trigrams; and
the term sequence comprises one of a unigram, a bigram, or a trigram.

10. A system comprising:
at least one processor; and
at least one non-transitory computer readable medium comprising instructions that, when executed by the at least one processor, cause the system to:
generate a first plurality of class scores for term sequences from a source text utilizing an implicit-class-recognition model by:
generating a plurality of feature vectors based on terms from the source text utilizing a plurality of LSTM layers; and
generating the first plurality of class scores for the term sequences based on the plurality of feature vectors utilizing a first convolutional neural network;
generate a second plurality of class scores for the term sequences from the source text utilizing an explicit-class-recognition model by:
generating similarity matrices based on the terms from the source text and a plurality of labels corresponding to the plurality of classes; and
analyzing the similarity matrices utilizing a second convolutional neural network to generate the second plurality of class scores; and
determine a class corresponding to a term sequence from the source text reflecting the class based on the first plurality of class scores and the second plurality of class scores.

11. The system of claim 10, further comprising instructions that, when executed by the at least one processor, cause the system to:
generate the first plurality of class scores by generating a first set of unigram class scores, a first set of bigram class scores, and a first set of trigram class scores utilizing the implicit-class-recognition model; and
generate the second plurality of class scores by generating a second set of unigram class scores, a second set of bigram class scores, and a second set of trigram class scores utilizing the explicit-class-recognition model.

12. The system of claim 10, further comprising instructions that, when executed by the at least one processor, cause the system to:
generate the plurality of feature vectors by:
generating a first feature vector for a first term embedding from a first term of the source text utilizing the plurality of LSTM layers; and
generating a second feature vector for a second term embedding from a second term of the source text utilizing the plurality of LSTM layers; and
generate the first plurality of class scores for the term sequences by utilizing the first convolutional neural network to generate a first unigram class score based on the first feature vector, generate a second unigram class score based on the second feature vector, and generate a bigram class score based on the first feature vector and the second feature vector.

13. The system of claim 10, further comprising instructions that, when executed by the at least one processor, cause the system to generate the similarity matrices by:
generating a first similarity matrix comprising similarity scores between source-term-feature vectors for the terms from the source text and label-feature vectors for a first label corresponding to a first class; and
generating a second similarity matrix comprising similarity scores between the source-term-feature vectors for the terms from the source text and label-feature vectors for a second label corresponding to a second class.

14. The system of claim 10, further comprising instructions that, when executed by the at least one processor, cause the system to generate the second plurality of class scores for the term sequences from the source text utilizing the explicit-class-recognition model by:
generating term frequency measures for the terms within the source text and within the plurality of labels; and
analyzing the term frequency measures and the similarity matrices utilizing the second convolutional neural network to generate the second plurality of class scores.

15. The system of claim 10, further comprising instructions that, when executed by the at least one processor, cause the system to apply a max pooling layer to the first plurality of class scores and the second plurality of class scores to generate consolidated-class scores for the term sequences.

16. The system of claim 15, further comprising instructions that, when executed by the at least one processor, cause the system to train the implicit-class-recognition model and the explicit-class-recognition model by:
applying an additional max pooling layer to the consolidated-class scores to determine the class; and comparing the class to a ground-truth class to modify internal parameters of the implicit-class-recognition model and the explicit-class-recognition model.

17. The system of claim 10, further comprising instructions that, when executed by the at least one processor, cause the system to provide, for display within a graphical user interface of a computing device, the source text and a visual indicator identifying the term sequence in the source text as corresponding to the class.

18. The system of claim 10, wherein:

the term sequences from the source text comprise unigrams, bigrams, and trigrams; and the term sequence comprises one of a unigram, a bigram, or a trigram.

19. A computer-implemented method comprising:

identifying a source text from a digital document and a plurality of classes;

generating a first plurality of n-gram class scores corresponding to a plurality of classes for term sequences from a source text utilizing an implicit-class-recognition model;

generating a second plurality of n-gram class scores corresponding to the plurality of classes for the term sequences from the source text utilizing an explicit-class-recognition model, wherein the first plurality of n-gram class scores and the second plurality of n-gram class scores indicate measures of likelihood that the term sequences from the source text correspond to the plurality of classes;

determining a class from the plurality of classes corresponding to the source text and a term sequence from the source text reflecting the class based on the first plurality of n-gram class scores and the second plurality of n-gram class scores; and providing the digital document for display within a graphical user interface comprising the source text and an indication of the term sequence corresponding to the class within the source text.

20. The method of claim 19, wherein:

the implicit-class-recognition model comprises a plurality of long-short-term memory layers and a first convolutional neural network; and the explicit-class-recognition model comprises a second convolutional neural network for multiple channels.

* * * * *